United States Patent
Singh et al.

(10) Patent No.: US 11,632,323 B2
(45) Date of Patent: Apr. 18, 2023

(54) ROUTING INFORMATION EXCHANGE BETWEEN SEPARATE NETWORKS TO IMPROVE END-TO-END NETWORK PERFORMANCE FOR USERS

(71) Applicant: MICROSOFT TECHNOLOGY LICENSING, LLC, Redmond, WA (US)

(72) Inventors: Rachee Singh, Redmond, WA (US); Sharad Agarwal, Seattle, WA (US); Ryan Andrew Beckett, Seattle, WA (US); Paramvir Bahl, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/405,961

(22) Filed: Aug. 18, 2021

(65) Prior Publication Data
US 2023/0058200 A1    Feb. 23, 2023

(51) Int. Cl.
*H04L 45/02*    (2022.01)
*H04L 45/00*    (2022.01)
(Continued)

(52) U.S. Cl.
CPC ............ *H04L 45/02* (2013.01); *H04L 45/126* (2013.01); *H04L 45/14* (2013.01); *H04L 45/24* (2013.01); *H04L 45/42* (2013.01)

(58) Field of Classification Search
CPC ....... H04L 45/02; H04L 45/126; H04L 45/14; H04L 45/24; H04L 45/42
See application file for complete search history.

(56) References Cited

U.S. PATENT DOCUMENTS

| 8,937,961 B1 * | 1/2015 | Vairavakkalai ......... H04L 45/02 709/243 |
| 9,124,957 B1 * | 9/2015 | Fogel ................ H04M 15/8044 |

(Continued)

FOREIGN PATENT DOCUMENTS

WO    2010105698 A1    9/2010

OTHER PUBLICATIONS

King, et al., "Applicability of the Path Computation Element to Inter-area and Inter-AS MPLS and GMPLS Traffic Engineering", Retrieved From: https://www.rfc-editor.org/rfc/rfc8694.pdf, Dec. 2019, 24 Pages.

(Continued)

*Primary Examiner* — Jimmy H Tran
(74) *Attorney, Agent, or Firm* — Newport IP, LLC; Jacob P. Rohwer

(57) ABSTRACT

The system disclosed herein implements an improved end-to-end network performance for data transmissions that span multiple networks operated by different organizations. The improvements are achieved as a result of exchanging routing information. For instance, the exchanged routing information can be representative of network performance factors. When different operators of different networks agree to exchange routing information, an optimal end-to-end path between two endpoint devices can be identified and selected for data transmission. This benefits both network operators as the users served by the networks are more likely to be satisfied with the user experience (e.g., faster download and upload of data).

20 Claims, 14 Drawing Sheets

(51) Int. Cl.
*H04L 45/24* (2022.01)
*H04L 45/12* (2022.01)
*H04L 45/42* (2022.01)

(56) References Cited

U.S. PATENT DOCUMENTS

| | | | | |
|---|---|---|---|---|
| 10,305,795 | B1* | 5/2019 | Barth | H04L 45/64 |
| 10,630,505 | B2* | 4/2020 | Rubenstein | H04L 61/4511 |
| 10,924,408 | B2* | 2/2021 | Raileanu | H04L 45/22 |
| 2006/0133282 | A1* | 6/2006 | Ramasamy | H04L 45/00 370/238 |
| 2006/0182034 | A1* | 8/2006 | Klinker | H04L 45/123 370/248 |
| 2009/0125631 | A1* | 5/2009 | Blom | H04L 41/5003 709/228 |
| 2009/0168789 | A1* | 7/2009 | Wood | H04L 45/02 370/402 |
| 2009/0190583 | A1* | 7/2009 | Accetta | H04L 45/04 370/389 |
| 2010/0318918 | A1* | 12/2010 | Mahmoodshahi | H04L 41/5051 715/752 |
| 2011/0060844 | A1* | 3/2011 | Allan | H04L 45/12 709/241 |
| 2011/0125920 | A1* | 5/2011 | Van Der Merwe | H04L 45/04 709/230 |
| 2011/0296006 | A1* | 12/2011 | Krishnaswamy | H04L 45/00 709/227 |
| 2012/0005371 | A1* | 1/2012 | Ravindran | H04L 45/64 709/242 |
| 2012/0039161 | A1* | 2/2012 | Allan | H04L 47/125 370/216 |
| 2012/0057466 | A1* | 3/2012 | Allan | H04L 45/50 370/238 |
| 2012/0275309 | A1* | 11/2012 | Jalil | H04L 45/124 370/238 |
| 2013/0166709 | A1* | 6/2013 | Doane | H04L 45/00 709/223 |
| 2013/0282897 | A1* | 10/2013 | Siegel | H04L 45/02 709/224 |
| 2014/0258523 | A1* | 9/2014 | Kazerani | H04L 43/12 709/224 |
| 2015/0032871 | A1* | 1/2015 | Allan | H04L 47/125 709/223 |
| 2015/0286655 | A1* | 10/2015 | von Haden | G06F 16/176 707/610 |
| 2016/0028618 | A1* | 1/2016 | Wahid | H04L 45/02 370/389 |
| 2016/0134542 | A1* | 5/2016 | Raileanu | H04L 47/122 370/237 |
| 2016/0380892 | A1 | 12/2016 | Mahadevan et al. | |
| 2017/0279726 | A1* | 9/2017 | Coffman | H04L 45/3065 |
| 2017/0331722 | A1* | 11/2017 | Greenbaum | H04L 45/125 |
| 2018/0048560 | A1* | 2/2018 | Burgio | H04L 45/22 |
| 2018/0091401 | A1* | 3/2018 | Richards | H04L 61/4511 |
| 2018/0198716 | A1* | 7/2018 | Karthikeyan | H04L 41/5009 |
| 2018/0331943 | A1* | 11/2018 | Shah | H04L 43/08 |
| 2018/0331945 | A1* | 11/2018 | Attarwala | H04L 45/124 |
| 2018/0331946 | A1* | 11/2018 | Olofsson | H04L 45/04 |
| 2018/0331947 | A1* | 11/2018 | James | H04L 45/124 |
| 2019/0173793 | A1* | 6/2019 | Liu | H04L 47/25 |
| 2020/0280494 | A1* | 9/2020 | Effendy | H04L 45/302 |
| 2020/0374215 | A1* | 11/2020 | Shah | H04L 43/026 |
| 2021/0021511 | A1* | 1/2021 | James | H04L 45/125 |
| 2021/0119890 | A1* | 4/2021 | Richards | H04L 43/08 |
| 2021/0243095 | A1* | 8/2021 | Attarwala | H04L 45/125 |
| 2021/0258239 | A1* | 8/2021 | Richards | H04L 43/08 |
| 2021/0399983 | A1* | 12/2021 | Blatt | H04L 9/0894 |
| 2022/0070086 | A1* | 3/2022 | Mermoud | H04L 41/147 |
| 2022/0070297 | A1* | 3/2022 | Rice | H04M 3/5175 |
| 2022/0078103 | A1* | 3/2022 | Prajapat | H04L 45/12 |
| 2022/0116311 | A1* | 4/2022 | Mestery | H04L 45/22 |
| 2022/0150740 | A1* | 5/2022 | Yao | H04W 76/10 |

OTHER PUBLICATIONS

"International Search Report Issued in PCT Application No. PCT/US22/035624", dated Oct. 18, 2022, 12 Pages.

* cited by examiner

ROUTING INFORMATION EXCHANGE BETWEEN SEPARATE NETWORKS TO IMPROVE END-TO-END NETWORK PERFORMANCE FOR USERS

BACKGROUND

A wide area network (WAN) is a computer network that typically spans various geographic regions (e.g., states, countries, continents, etc.). Different types of organizations, such as businesses or enterprises, educational institutions, government entities, etc., operate WANs to enable the transmission of data to users and user devices dispersed across the various geographic regions. The users may be clients, students, employees, subscribers, and so forth. WANs can also be used to connect local area networks (LANs), as well as other types of networks, together so that user devices in one geographic location can communicate with user devices in other geographic locations.

WANs can be private such that they are built and operated by one particular organization. Furthermore, some WANs are built and operated in a commercial manner to provide Internet connections to various users. The organizations that operate these WANs may be referred to as Internet Service Providers (ISPs). Accordingly, in many scenarios, data that is transmitted from a first endpoint device (e.g., a server that stores requested data) to a second endpoint device (e.g., a user device that requests the data) is often transmitted across multiple different WANs, and these WANs can have different operators. For instance, a cloud content provider may operate a first WAN that contains the aforementioned first endpoint device from which requested data is served and an ISP may operate a second WAN to provide Internet to the aforementioned second endpoint device. As used herein, organizations that operate WANs, regardless of organization type, may be referred to as "operators".

An operator is able to make routing decisions within their own WAN. However, an operator of one WAN has no control over routing decisions made in other WANs that may be used or needed to transmit data between two endpoint devices. More specifically, an operator can select an optimal routing path within their own WAN by monitoring and analyzing the performance of various routing paths within the WAN. However, at some point, the data being transmitted exits the operator's WAN and enters another operator's WAN, and therefore, the original operator no longer has control over the routing decisions. The point of entry into the other operator's WAN may not provide the ability for the other operator to select an optimal routing path within the other WAN. Consequently, the end-to-end network performance between two endpoint devices, which spans multiple WANs, can be negatively affected by routing decisions made by different operators, thereby causing a sub-optimal user experience.

It is with respect to these and other considerations the disclosure made herein is presented.

SUMMARY

The system disclosed herein improves the end-to-end network performance for data transmissions that spans multiple networks operated by different organizations. The improvements are achieved as a result of exchanging routing information. For instance, the exchanged routing information can be representative of network performance factors. When different operators of different networks agree to exchange routing information, an optimal end-to-end path between two endpoint devices can be identified and selected for data transmission. This benefits both network operators as the users served by the networks are more likely to be satisfied with the user experience (e.g., faster download and upload of data).

As further described herein, the routing information can include actionable path information related to latency, available bandwidth, cost, packet loss rate, and jitter. The routing information can also include geographic regions and/or identifications of manufacturers of network transmission equipment in order for data transmission to comply with policies and/or constraints set by regulatory agencies and/or enterprises.

In various examples, one endpoint device can be a server device in a first network. A server device is one which either (i) transmits data to a user device served by a second network in response to a data request or (ii) receives data from the user device based on a data upload (e.g., a user requests that data be stored in a cloud-based account). The data may be web site data, streaming video data, social media data, gaming data, user data (e.g., photos, documents, files, etc.), other types of "app" data, and so forth. The other endpoint device can be the user device itself. Alternatively, the other endpoint device can be a network device (e.g., a router) connected to the second network that enables an Internet connection for the user device (e.g., a Wi-Fi connection).

In examples described herein, the aforementioned networks are wide area networks (WANs). However, it is understood in the context of this disclosure that the aforementioned networks can be other types of wired and/or wireless networks, operated by different organizations, that connect two endpoint devices for data transmission purposes. For example, the two endpoint devices may be a user device and a server device. In another example, the two endpoint devices may be a first user device and a second user device. In yet another example, the two endpoint devices may be a first server device and a second server device.

As described above, the end-to-end path used to transmit the data from one endpoint device to another endpoint device can span multiple WANs. Accordingly, in a data download situation, the end-to-end network path can be comprised of (i) a first path that originates at a server endpoint device within a first WAN and ends at an egress point of the first WAN and (ii) a second path the originates at an ingress point of a second WAN and ends at a user endpoint device within the second WAN. In a data upload situation, the end-to-end network path can be comprised of (i) a first path that originates at a user endpoint device within a first WAN and ends at an egress point of the first WAN and (ii) a second path the originates at an ingress point of a second WAN and ends at a server endpoint device within the second WAN. A server device on an edge or boundary of a WAN may be referred to as either an egress point in the sense that the server device enables data to exit the WAN, or as an ingress point in the sense that the server device enables data to enter the WAN. This reference depends on the direction of data transmission (e.g., a download of data to the user device or an upload of data from the user device).

Since the WANs can be private WANs, the operators do not typically share information related to the way in which paths are selected and/or the network performance of available paths. Accordingly, while a first operator may select an optimal path within its own first WAN to a particular egress point, the particular egress point of the selected path for the first WAN may be matched with an ingress point of a second WAN that does not enable a second operator to select an optimal path to a user endpoint device. Consequently, the overall performance of the end-to-end path still suffers (e.g., the user experiences unnecessary latency).

Via the techniques described herein, operators of WANs agree to cooperate to enable the identification and selection of a better end-to-end path between two endpoint devices (e.g., a server endpoint device and a user endpoint device). For example, operators can exchange information so one operator can select an egress point of a first WAN that, according to factors such as geography, is paired or matched with an ingress point of a second WAN such that the end-to-end path is one that provides the best network performance, or alternatively, is one that satisfies a preestablished network performance threshold.

As described herein, a first WAN can include a system (e.g., one or more server devices) configured with modules to receive routing information from a second WAN. The routing information can include actionable information for multiple different paths between a first endpoint device (e.g., a user device or a server device) and one of an ingress or an egress point in the second WAN, depending on which direction the data is being transmitted. The routing information can include network performance measurements related to latency, available bandwidth, cost, packet loss rate, and/or jitter. The routing information can further include geographic regions and/or identifications of manufacturers of network transmission equipment in order for data transmission to comply with policies and/or constraints. The policies and/or constraints may be established by regulatory agencies (e.g., a government). Alternatively, the policies and/or constraints may be established by operators of the WANs, or by organizations (e.g., clients of cloud providers) that are providing a service enabling a data transmission.

The system of the first WAN is configured to combine each of the paths in the second WAN with one of multiple different paths in the first WAN. Each path in the first WAN is configured between the second endpoint device and the other of an ingress or an egress point in the first WAN, again, depending on which direction the data is being transmitted. These combinations of paths in two different WANs effectively creates a plurality of end-to-end paths from the first endpoint device to the second endpoint device. In various examples, these combinations are made based on factors that improve the way in which data exits one WAN and enters the other WAN. For instance, a factor can include geographic proximity between a location of an egress point of the first WAN and a location of an ingress point of the second WAN. That is, the closer the two points are to each other the more likely paths that end or start at the two points will be combined.

The system of the first WAN is also configured to collect and/or access routing information for the multiple different paths in the first WAN. The system uses its own internal routing information for the first WAN and the received routing information from the second WAN to perform calculations and/or operations useable to effectively rank the plurality of end-to-end paths for selection purposes. To improve technical efficiencies and reduce overhead, the calculations and/or operations can be simple ones, such as addition, subtraction, and/or comparisons to determine if a value is greater than or less than another value. The system can then identify (e.g., select) an end-to-end path, from the ranked end-to-end paths, for data to be transmitted from one endpoint device to the other endpoint device. The system initiates the data transmission on a path within the first WAN that is part of the identified end-to-end path.

In various examples, to help ensure that an operator of the second WAN routes the data on the path within the second WAN that is also part of the identified end-to-end path, the system of the first WAN can implement Differentiated Services (DiffServe) or Differentiated Services Code Point (DSCP) tagging of data packets that comprise the data transmission. This effectively informs or commands the operator of the second WAN of performance or quality of service (QoS) expectations with respect to the data transmission. That is, via the tagging process, the operator of the first WAN can define acceptable performance values for latency, available bandwidth, cost, packet loss rate, and/or jitter. These values can be defined by the system based on the calculations to effectively cause the second WAN to route the data packets on the path within the second WAN that is part of the identified end-to-end path. Furthermore, via the tagging process, the operator of the first WAN can define geographic regions and/or identifications of manufacturers of network transmission equipment that are approved or not approved for data transmission, in accordance with a policy or a constraint.

The techniques disclosed herein provide a number of features that improve existing computing devices, such as servers and network routing equipment implemented within various networks (e.g., WANs). For instance, the devices are less likely to become overloaded or fail, thereby ensuring that routing operations run more smoothly (e.g., computing resources such as processor cycles, memory, network bandwidth are saved). Consequently, the end-to-end user experience with respect to data transmission across multiple disparate networks is greatly improved. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The system disclosed herein implements an improved end-to-end network performance for data transmissions that span multiple networks operated by different organizations. The improvements are achieved as a result of exchanging routing information. For instance, the exchanged routing information can be representative of network performance factors. When different operators of different networks agree to exchange routing information, an optimal end-to-end path between two endpoint devices can be identified and selected for data transmission. This benefits both network operators as the users served by the networks are more likely to be satisfied with the user experience (e.g., faster download and upload of data).

Figure 1:
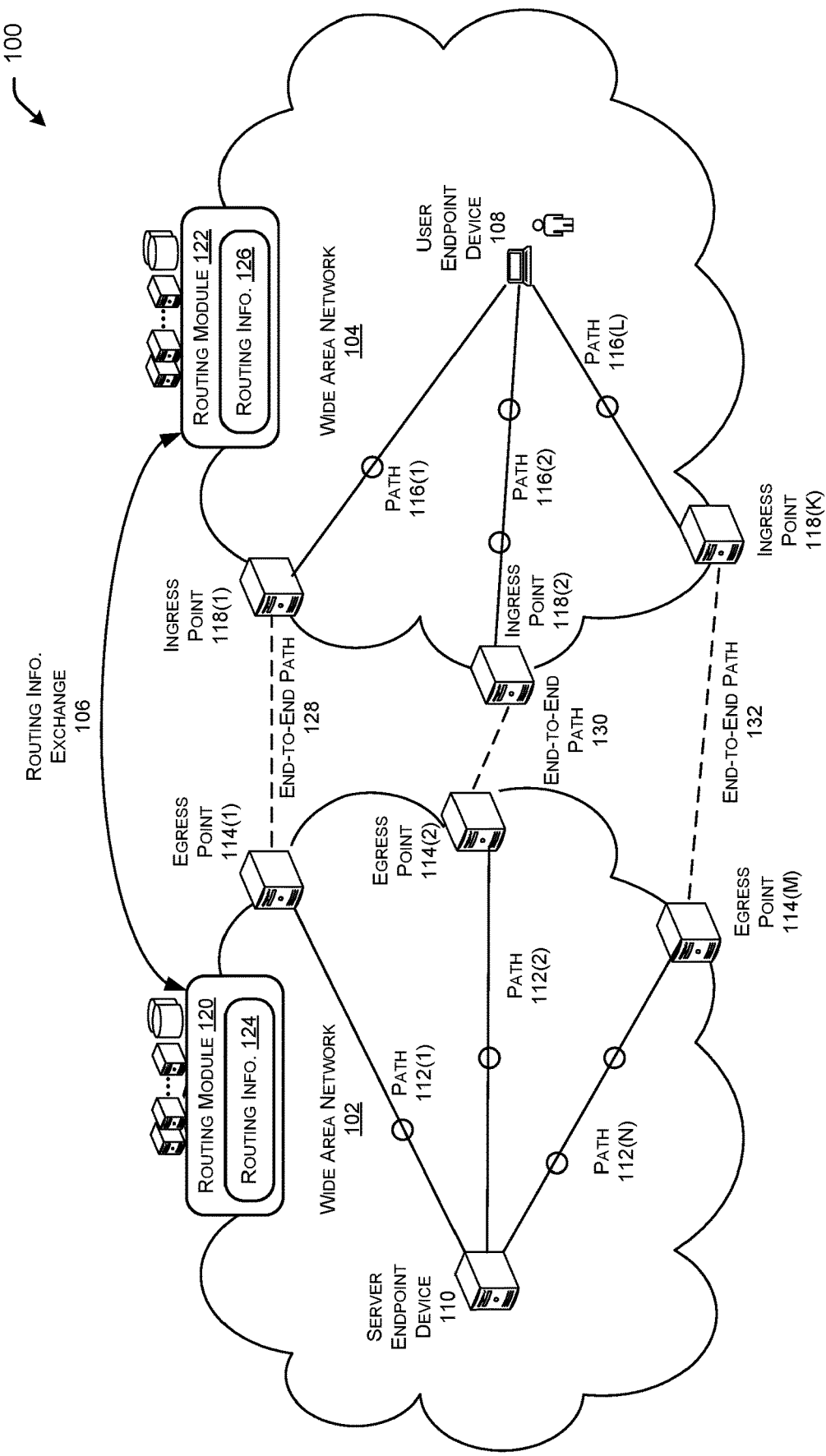
FIG. 1 illustrates an example environment in which two different operators of two different wide area networks (WANs) exchange routing information in order to improve path selection and optimize the user experience.

FIG. 1 illustrates an example environment 100 in which a first operator of a first network 102 and a second operator of a second network 104 exchange routing information 106 in order to improve path selection and optimize the network transmission experience between endpoint devices. As further discussed herein, the exchanged routing information 106 can include latency, available bandwidth, cost, packet loss rate, jitter, geographic locations of network transmission equipment, and identifications of manufacturers of the network transmission equipment.

While the networks 102, 104 shown in the illustrated FIGURES are described herein with respect to wide area networks (WANs), it is understood in the context of this disclosure that the network(s) 102, 104 may alternatively include any type of wired and/or wireless networks, including but not limited to local area networks (LANs), satellite networks, cable networks, Wi-Fi networks, WiMax networks, mobile communications networks (e.g., 3G, 4G, and so forth), or any combination thereof. The networks 102, 104 may utilize communications protocols, including packet-based and/or datagram-based protocols such as Internet protocol (IP), transmission control protocol (TCP), user datagram protocol (UDP), or other types of protocols. Moreover, networks 102, 104 may also include a number of devices that facilitate network communications and/or form a hardware basis for the networks, such as switches, routers, gateways, access points, firewalls, base stations, repeaters, backbone devices, and the like. These devices may compose the network transmission hardware or equipment.

FIG. 1 illustrates a user endpoint device 108 and a server endpoint device 110 from which data is being downloaded or to which data is being uploaded. Thus, the path identification and selection techniques described herein can be implemented in association with data being transmitted in either direction (e.g., to the server endpoint device 110 or from the server endpoint device 110). While the examples are described herein with respect to the user endpoint device 108 and the server endpoint device 110, it is understood in the context of this disclosure that the techniques can be implemented between any two endpoint devices (e.g., two user endpoint devices, two server endpoint devices, etc.).

As shown and as further discussed herein, a data transmission can be implemented across various paths that span the first WAN 102 and the second WAN 104. In one example, the first WAN 102 may be operated by a cloud content provider and the second WAN 104 may be operated by an Internet Service Provider (ISP) that is serving the user endpoint device 108 or a network device (e.g., router) that enables an Internet connection for the user endpoint device 108.

Consequently, FIG. 1 shows a set of first paths 112(1-N) within the first WAN 102, where N is a positive integer number (e.g., ten paths, fifty paths, one hundred paths, etc.). For ease of discussion, the examples described herein correspond to a data download or data being transmitted from the server endpoint device 110 to the user endpoint device 108, e.g., in response to a data download request. However, as described above, the techniques can also be implemented in association with data transmitted in the opposite direction, e.g., data being uploaded from the user endpoint device 108 to the server endpoint device 110. The data may be web site data, streaming video data, social media data, gaming data, user data (e.g., photos, documents, files, etc.), other types of "app" data, and so forth.

In accordance with the data download example, each of paths 112(1-N) originates at the server endpoint device 110 and ends at one of various egress points 114(1-M) for the first WAN 102, where M is a positive integer number (e.g., four egress points, ten egress points, fifty egress points, etc.). The egress points 114(1-M) comprise server devices at different geographic locations on an edge or boundary of the WAN 102 and are referred to as egress points 114(1-M) in the sense that the server devices enable data to exit the WAN 102.

Furthermore, each path 112(1-N) comprises various network transmission equipment that enables the data transmission along a path. Different devices of this network transmission equipment along a path are represented by circles. In some instances, a data transmission from one device to another device along a path may be referred to as a hop. The number of hops on a path can be a small number (e.g., two, three, five, etc.) or a large number (e.g., ten, fifteen, twenty, etc.). As mentioned above, these devices can comprise switches, routers, gateways, access points, firewalls, base stations, repeaters, backbone devices, and the like. Consequently, different paths originating at the server endpoint device 110, but that use different intermediate network transmission equipment, may end at the same egress point.

Similarly, FIG. 1 shows a set of second paths 116(1-L) within the second WAN 104, where L is a positive integer number (e.g., ten paths, fifty paths, one hundred paths, etc.). Continuing the data download example, each of these paths 116(1-L) originates at one of various ingress points 118(1-K) for the second WAN 104, where K is a positive integer number (e.g., four ingress points, ten ingress points, fifty ingress points, etc.), and ends at the user endpoint device 108. The ingress points 118(1-K) comprise server devices at different geographic locations on an edge or boundary of the WAN 104 and are referred to as ingress points 118(1-K) in the sense that the server devices enable data to enter the WAN 104. Each path 116(1-L) also comprises various network transmission equipment represented by the circles. Accordingly, different paths may start at the same ingress point and end at the user endpoint device 108.

FIG. 1 illustrates systems that operate routing modules 120, 122 for the respective WANS 102, 104. The routing modules 120, 122 are configured to monitor the network paths 112(1-N), 116(1-L) within their respective WANS 102, 104 and collect routing information 124, 126 for the different paths 112(1-N), 116(1-L). As further described herein, this routing information 124, 126 can include network performance measurements for various metrics (e.g., latency, available bandwidth, cost, packet loss rate, jitter, etc.). In various examples, the performance monitoring enables a real-time, or near real-time, analysis as it relates to network use and performance. The routing information 124, 126 can also include geographic locations of various network transmission equipment used on the paths 112(1-N), 116(1-L), as well as identifications of manufacturers of the network transmission equipment used on the paths 112(1-N), 116(1-L). This routing information 124, 126 is sent and/or received, via the routing information exchange 106, to and/or from the operator of the other WAN.

In the data download situation, the routing module 120 of WAN 102 receives the routing information 126 for WAN 104 via the routing information exchange 106. The routing module 120 is configured to combine each of the paths 116(1-L) in the WAN 104 with one of the multiple different paths 112(1-N) in the WAN 102. These combinations of paths in two different WANs effectively creates a plurality of end-to-end paths from the server endpoint device 110 to the user endpoint device 108. For instance, a first end-to-end path 128 comprises path 112(1) in WAN 102 and path 116(1) in WAN 104, as well as any network transmission that occurs between egress point 114(1) and ingress point 118(1). A second end-to-end path 130 comprises path 112(2) in WAN 102 and path 116(2) in WAN 104, as well as any network transmission that occurs between egress point 114(2) and ingress point 118(2). A third end-to-end path 132 comprises path 112(N) in WAN 102 and path 116(L) in WAN 104, as well as any network transmission that occurs between egress point 114(M) and ingress point 118(K).

The routing module 120 makes the combinations based on factors that improve the way in which data exits one WAN 102 and enters the other WAN 104. For instance, a factor can include geographic proximity between a location of an egress point (e.g., egress point 114(1)) of WAN 102 and a location of an ingress point (e.g., ingress point 118(1)) of WAN 104. That is, an egress point and an ingress point are more likely to be matched or paired, for path combination purposes, if they are geographically located close to each other.

Figure 2A:
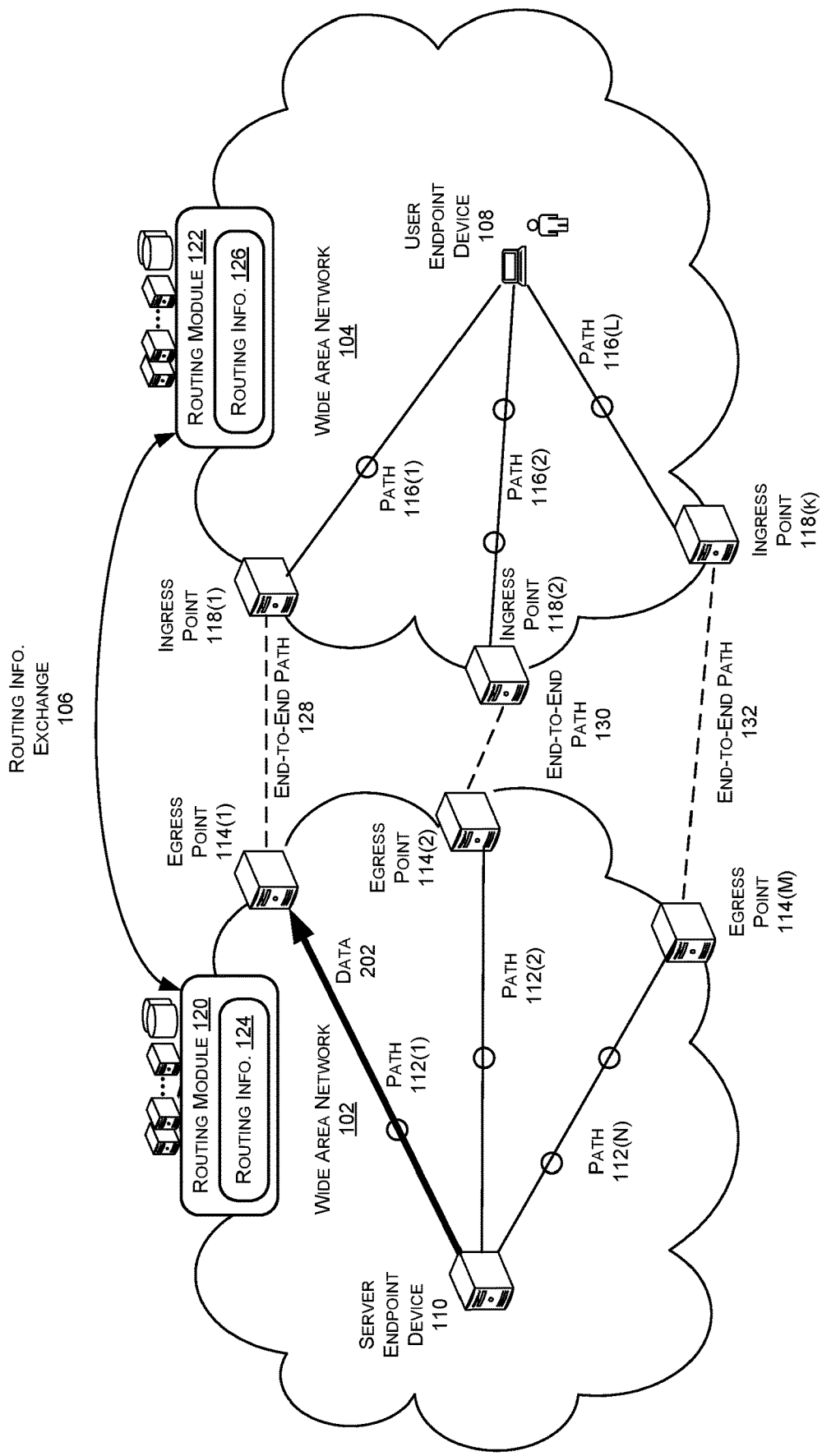
FIG. 2A illustrates the example environment of FIG. 1 where an operator selects a path for a data transmission, within its own network, that is part of an identified end-to-end path that is optimal for the data transmission.

FIG. 2A illustrates the example environment of FIG. 1 where an operator selects a path for a data transmission, within its own network, that is part of an identified end-to-end path that is optimal for the data transmission. As shown by the bolded line of path 112(1), the routing module 120 of WAN 102 has identified end-to-end path 128 as the one that is optimal or best suited for a particular data transmission between the server endpoint device 110 and the user endpoint device 108. The identification and selection of path 112(1) is based on the performance of calculations and/or operations useable to effectively rank the end-to-end paths. As further described herein with respect to FIGS. 3A-3E, the calculations and/or operations can be simple ones, such as addition, subtraction, and/or comparisons to determine if a value is greater than or less than another value. The routing module 120 of WAN 102 can then initiate the data transmission on path 112(1) within WAN 102, as referenced by 202. That is, the routing module 120 can route data packets, which are destined for the user endpoint device 108 via WAN 104, along path 112(1) within its own WAN 102.

Figure 2B:
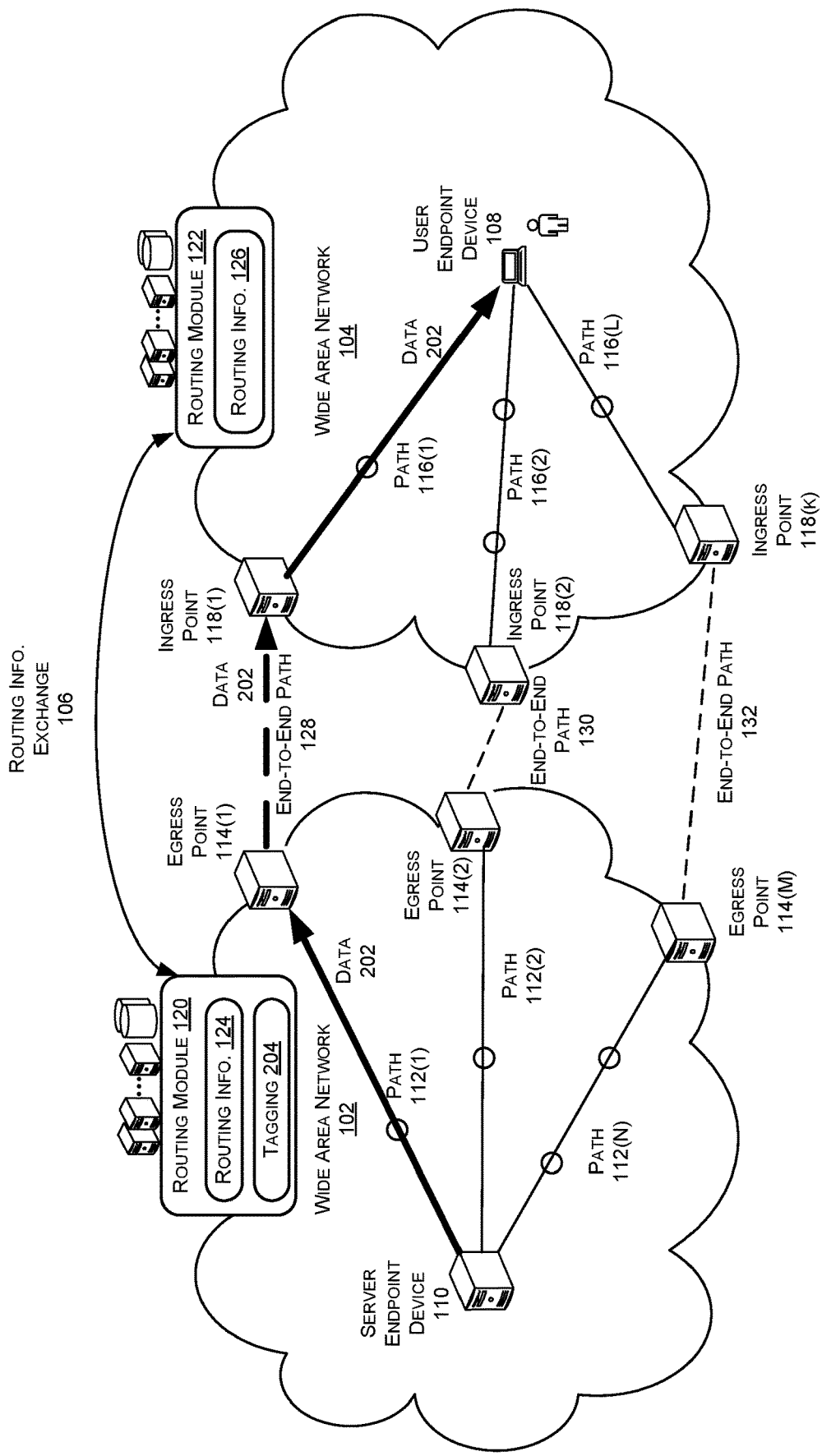
FIG. 2B illustrates the example environment of FIG. 1 where an operator tags data packets to effectively enable another operator of another network to select a path for the data transmission of FIG. 2A which is also part of the identified end-to-end path that is optimal for the data transmission.

FIG. 2B illustrates the example environment of FIG. 1 where an operator tags data packets to effectively enable another operator of another network to select a path for the data transmission of FIG. 2A, which is also part of the identified end-to-end path that is optimal for the data transmission. Accordingly, the routing module 120 is shown to implement a tagging 204 process for the data packets transmitted along path 112(1). For example, the tagging 204 of data packets can be Differentiated Services (DiffServe) or Differentiated Services Code Point (DSCP) tagging which defines acceptable performance values for latency, available bandwidth, cost, packet loss rate, and/or jitter. By analyzing the overall performance metrics of the end-to-end paths 128, 130, 132 based on the calculations and operations discussed herein with respect to FIGS. 3A-3E, and knowing that the data 202 is likely to enter WAN 104 at ingress point 118(1), the routing module 120 can define performance values that effectively informs or commands the operator of WAN 104 of performance or quality of service (QoS) expectations with respect to the data 202.

These values can guide the routing module 122 to select path 116(1) in WAN 104, as shown by the bolded line, and/or eliminate other paths that originate at ingress point 118(1) and end at the user endpoint device 108 because these other paths do not satisfy the performance or quality of service (QoS) expectations established by the tagging. Consequently, the optimal end-to-end path 128, comprising path 112(1) and 116(1) in two different WANs 102, 104, is realized for transmission of the data 202.

Figure 3A:
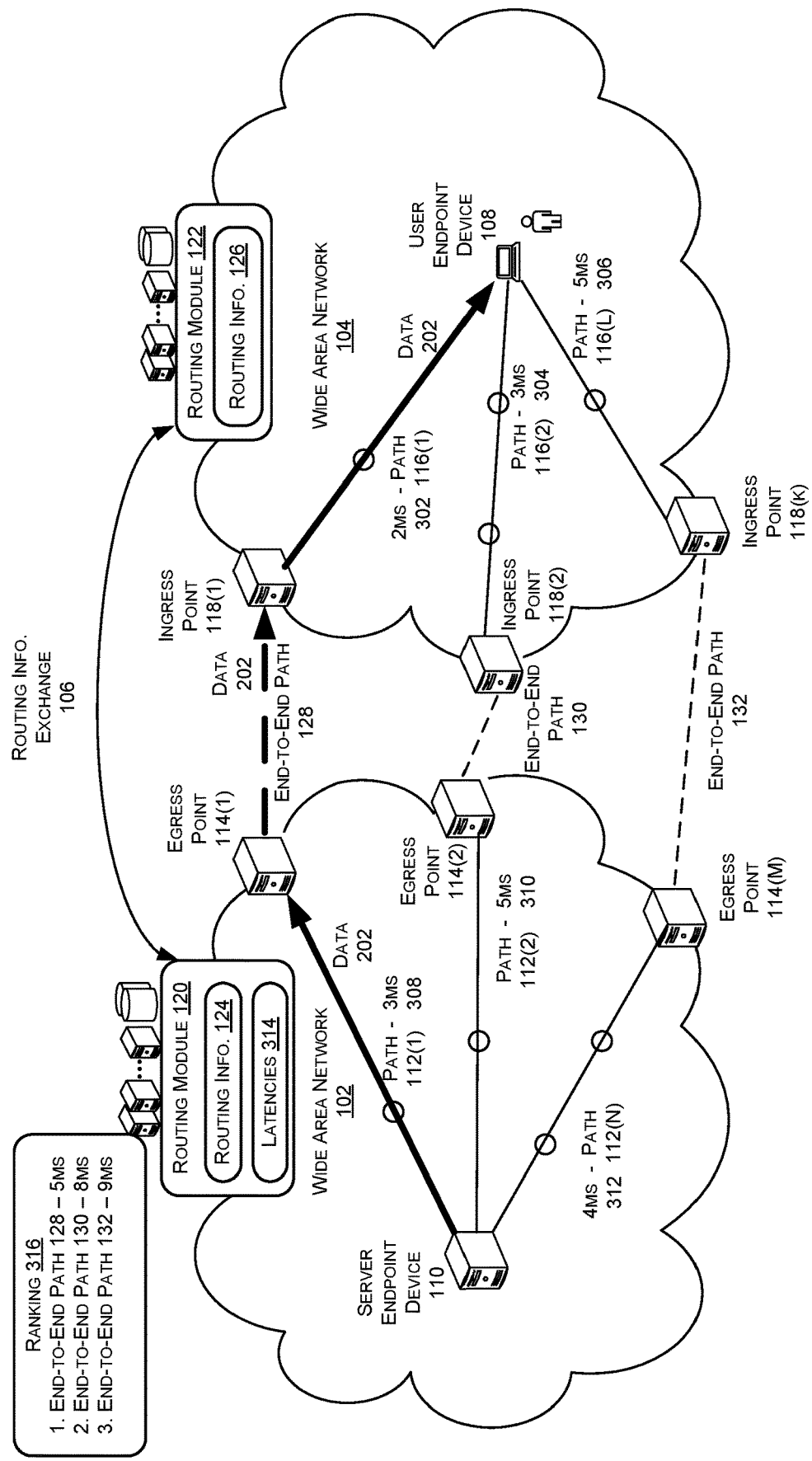
FIG. 3A illustrates an example scenario in which latency is the performance metric, or one of the performance metrics, used to identify an optimal end-to-end path.

FIG. 3A illustrates an example scenario in which latency is the performance metric, or one of the performance metrics, used to identify an optimal end-to-end path. The routing information 126 monitored and/or collected by the routing module 122 for WAN 104 can indicate that path 116(1) has a latency of two milliseconds (ms) 302, that path 116(2) has a latency of three milliseconds (ms) 304, and that path 116(L) has a latency of five milliseconds (ms) 306. Similarly, the routing information 124 monitored and/or collected by routing module 120 for WAN 102 can indicate that path 112(1) has a latency of four milliseconds (ms) 308, that path 112(2) has a latency of five milliseconds (ms) 310, and that path 112(N) has a latency of four milliseconds (ms) 312.

Consequently, using the routing information 126 received from the routing module 122 via the routing information exchange 106, and the routing information 124 collected internally within its own WAN 102, the routing module 120 can perform calculations that add the latencies for paths combined with each other as a result of paired ingress and egress points, thereby generating a set of end-to-end latencies 314 for the end-to-end paths. Furthermore, the routing module 120 can rank the end-to-end paths based on the latencies 314. As shown via the ranking 316, end-to-end path 128 is the top-ranked end-to-end path with a total latency of five milliseconds (ms), end-to-end path 130 is the second-ranked end-to-end path with a total latency of eight milliseconds (ms), and end-to-end path 132 is the third-ranked end-to-end path with a total latency of nine milliseconds (ms).

Accordingly, the routing module 120 can identify the top-ranked end-to-end path 128 by comparing the end-to-end latencies and determining which one has the lowest end-to-end latency, select the corresponding path 112(1) of the top-ranked end-to-end path 128 that is within its own WAN 102 for a data transmission, and at least initiate the data transmission based on its control and routing decision-making capabilities within WAN 102. Via the identification and selection of path 112(1) as being part of a top-ranked end-to-end path, an operator of WAN 102 puts the operator of WAN 104 in a position to make routing decisions that optimize the end-to-end data transmission. As described above with respect to FIG. 2B, in some examples, the operator of WAN 102 can also use a tagging process to help guide the selection of path 116(1) by the operator of WAN 104.

The units and/or measurements used above with respect to FIG. 3A, and those used herein with respect to FIGS. 3B-3E are used for illustration and ease of discussion purposes only. That is, units used for the metrics and factors may be different than the examples used. Moreover, actual measurements of latency, available bandwidth, cost, packet loss rate, and/or jitter may be higher or lower than the examples used. Furthermore, three end-to-end paths are shown to be ranked. However, in most cases, the number of ranked end-to-end paths will be higher (e.g., five end-to-end paths, twenty end-to-end paths, fifty end-to-end paths, etc.).

Figure 3B:
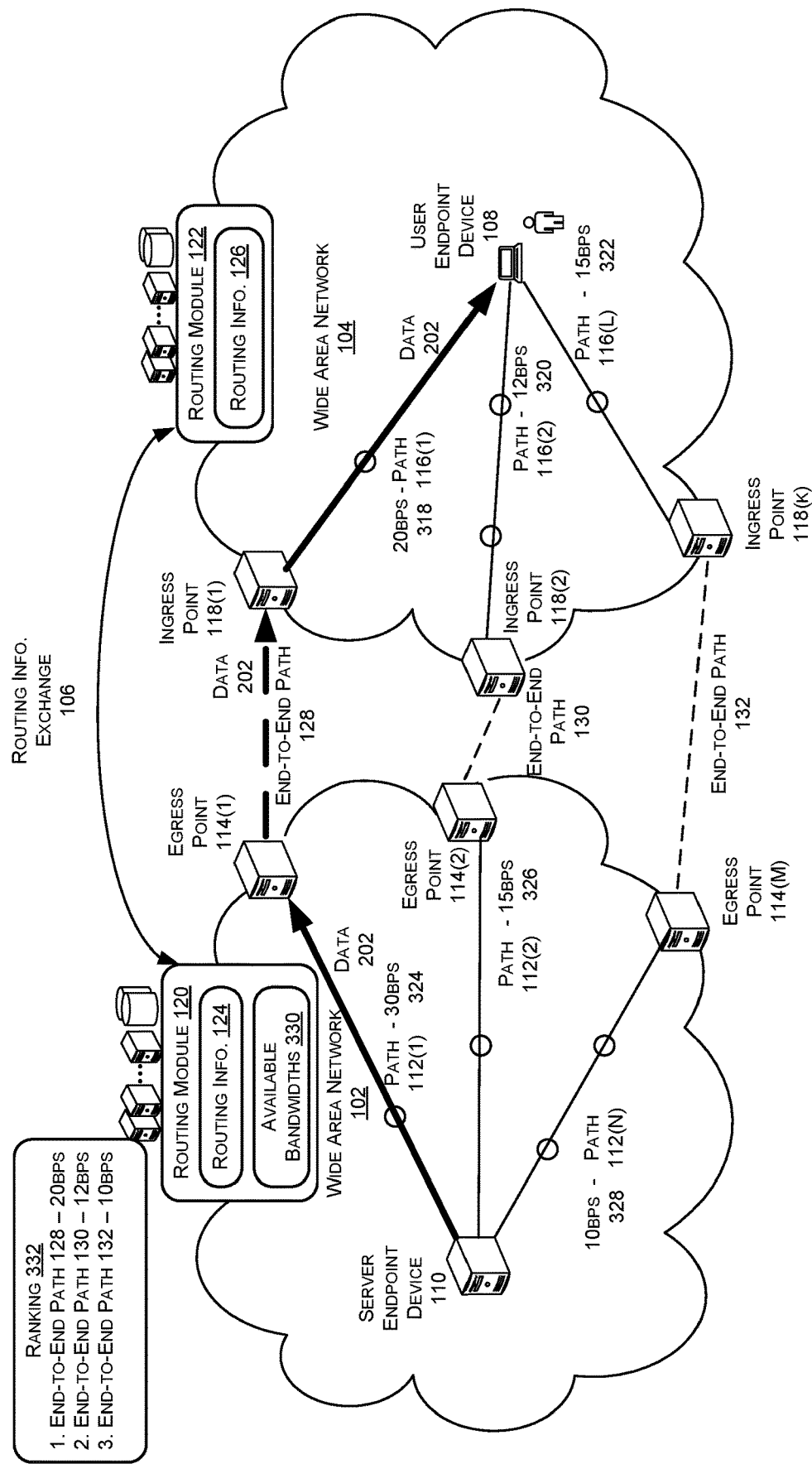
FIG. 3B illustrates an example scenario in which available bandwidth is the performance metric, or one of the performance metrics, used to identify an optimal end-to-end path.

FIG. 3B illustrates an example scenario in which available bandwidth is the performance metric, or one of the performance metrics, used to identify an optimal end-to-end path. The routing information 126 monitored and/or collected by the routing module 122 for WAN 104 can indicate that path 116(1) has an available bandwidth of twenty bits per second (bps) 318, that path 116(2) has an available bandwidth of twelve bits per second (bps) 320, and that path 116(L) an available bandwidth of fifteen bits per second (bps) 322. Similarly, the routing information 124 monitored and/or collected by routing module 120 for WAN 102 can indicate that path 112(1) has an available bandwidth of thirty bits per second (bps) 324, that path 112(2) has an available bandwidth of fifteen bits per second (bps) 326, and that path 112(N) has an available bandwidth of ten bits per second (bps) 328.

Consequently, using the routing information 126 received from the routing module 122 via the routing information exchange 106, and the routing information 124 collected internally within its own WAN 102, the routing module 120 can perform operations that compare the minimum available bandwidths for the end-to-end paths produced based on the combinations, thereby generating a set of lowest available bandwidths 330 for the end-to-end paths. The minimum available bandwidth may correspond to a segment of an end-to-end path (e.g., segment 116(1), segment 116(2), segment 112(N), etc.).

The routing module 120 can then rank the end-to-end paths based on the minimum available bandwidths 330. As shown via the ranking 332, end-to-end path 128 is the top-ranked end-to-end path with a minimum available bandwidth that is the highest (e.g., 20 bps), end-to-end path 130 is the second-ranked end-to-end path with a minimum available bandwidth that is the next highest (e.g., 12 bps), and end-to-end path 132 is the third-ranked end-to-end path with a minimum available bandwidth that is the next highest (e.g., 10 bps).

Accordingly, the routing module 120 can identify the top-ranked end-to-end path 128 by comparing the minimum available bandwidth and determining which one has the highest minimum available bandwidth, select the corresponding path 112(1) of the top-ranked end-to-end path 128 that is within its own WAN 102 for a data transmission, and at least initiate the data transmission based on its control and routing decision-making capabilities within WAN 102.

Figure 3C:
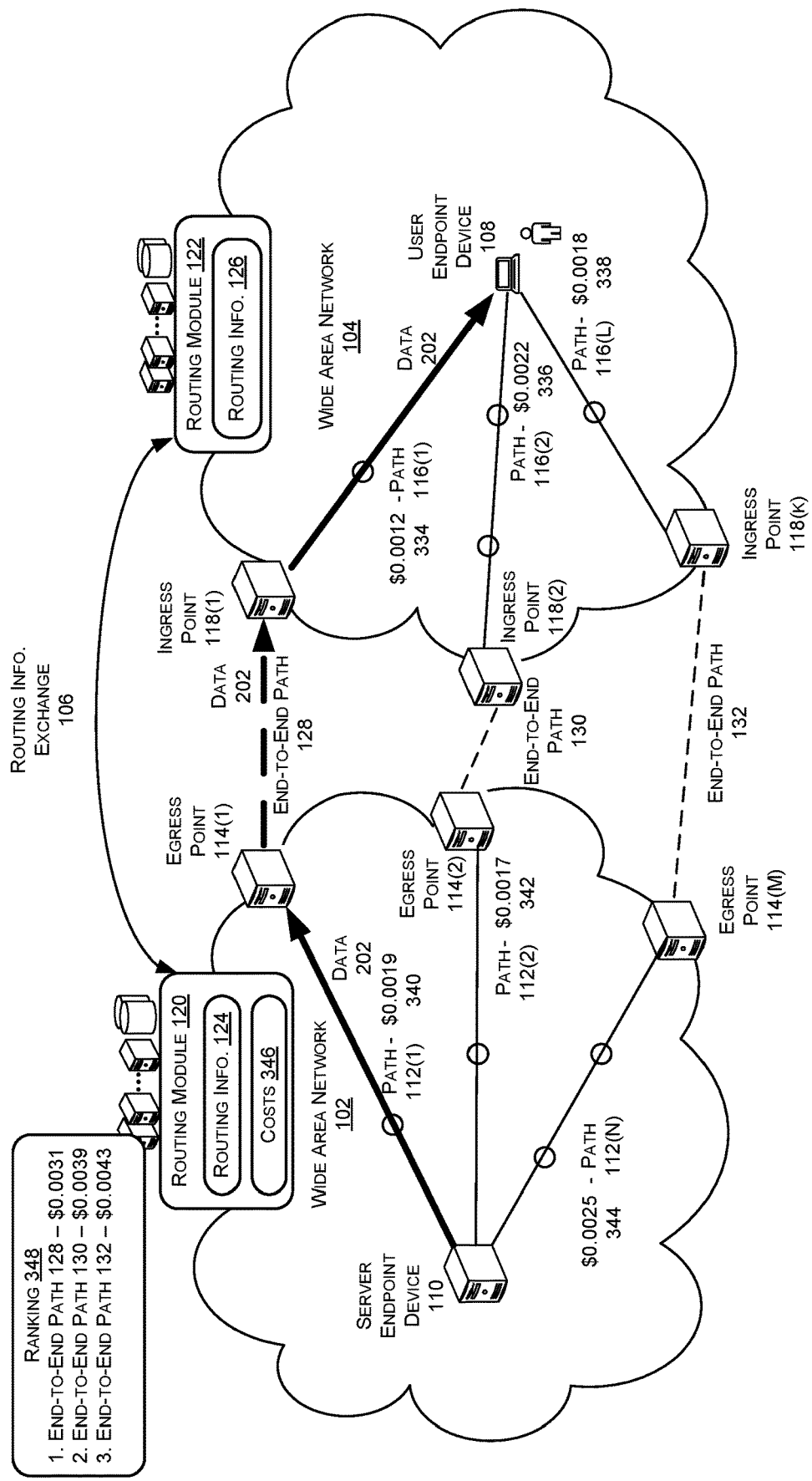
FIG. 3C illustrates an example scenario in which cost is the performance metric, or one of the performance metrics, used to identify an optimal end-to-end path.

FIG. 3C illustrates an example scenario in which cost is the performance metric, or one of the performance metrics, used to identify an optimal end-to-end path. The routing information 126 monitored and/or collected by the routing module 122 for WAN 104 can indicate that path 116(1) has a cost of $0.0012 (or twelve hundredths of a cent) 334 to transmit the data, that path 116(2) has a cost of $0.0022 336 to transmit the data, and that path 116(L) has a cost of $0.0018 338 to transmit the data. Similarly, the routing information 124 monitored and/or collected by routing module 120 for WAN 102 can indicate that path 112(1) has a cost of $0.0019 340 to transmit the data, that path 112(2) has a cost of $0.0017 342 to transmit the data, and that path 112(N) has a cost of $0.0025 344 to transmit the data.

Consequently, using the routing information 126 received from the routing module 122 via the routing information exchange 106, and the routing information 124 collected internally within its own WAN 102, the routing module 120 can perform calculations that add the costs for paths combined with each other as a result of paired ingress and egress points, thereby generating a set of end-to-end costs 346 for the end-to-end paths. Furthermore, the routing module 120 can rank the end-to-end paths based on the costs 346. As shown via the ranking 348, end-to-end path 128 is the top-ranked end-to-end path with a total cost of $0.0031, end-to-end path 130 is the second-ranked end-to-end path with a total cost of $0.0039, and end-to-end path 132 is the third-ranked end-to-end path with a total cost of $0.0043.

Accordingly, the routing module 120 can identify the top-ranked end-to-end path 128 by comparing the end-to-end costs and determining which one has the lowest end-to-end cost, select the corresponding path 112(1) of the top-ranked end-to-end path 128 that is within its own WAN 102 for a data transmission, and at least initiate the data transmission based on its control and routing decision-making capabilities within WAN 102.

Note that in the example of FIG. 3C the operator of WAN 102 selects a more expensive route (e.g., path 112(1) is more expensive than path 112(2)) in order to enable the operator of WAN 104 to select the cheapest route (e.g., path 116(1) is cheaper than paths 116(2) and 116(L)). While this improves the overall cost of the data transmission, this may not be in the sole interest of the operator of WAN 102. However, via the agreement to exchange routing information to make routing decision for a large number of data transmissions (e.g., data flows), the operator of WAN 104 likely will make a similar routing decision to return the favor to the operator of WAN 102.

Figure 3D:
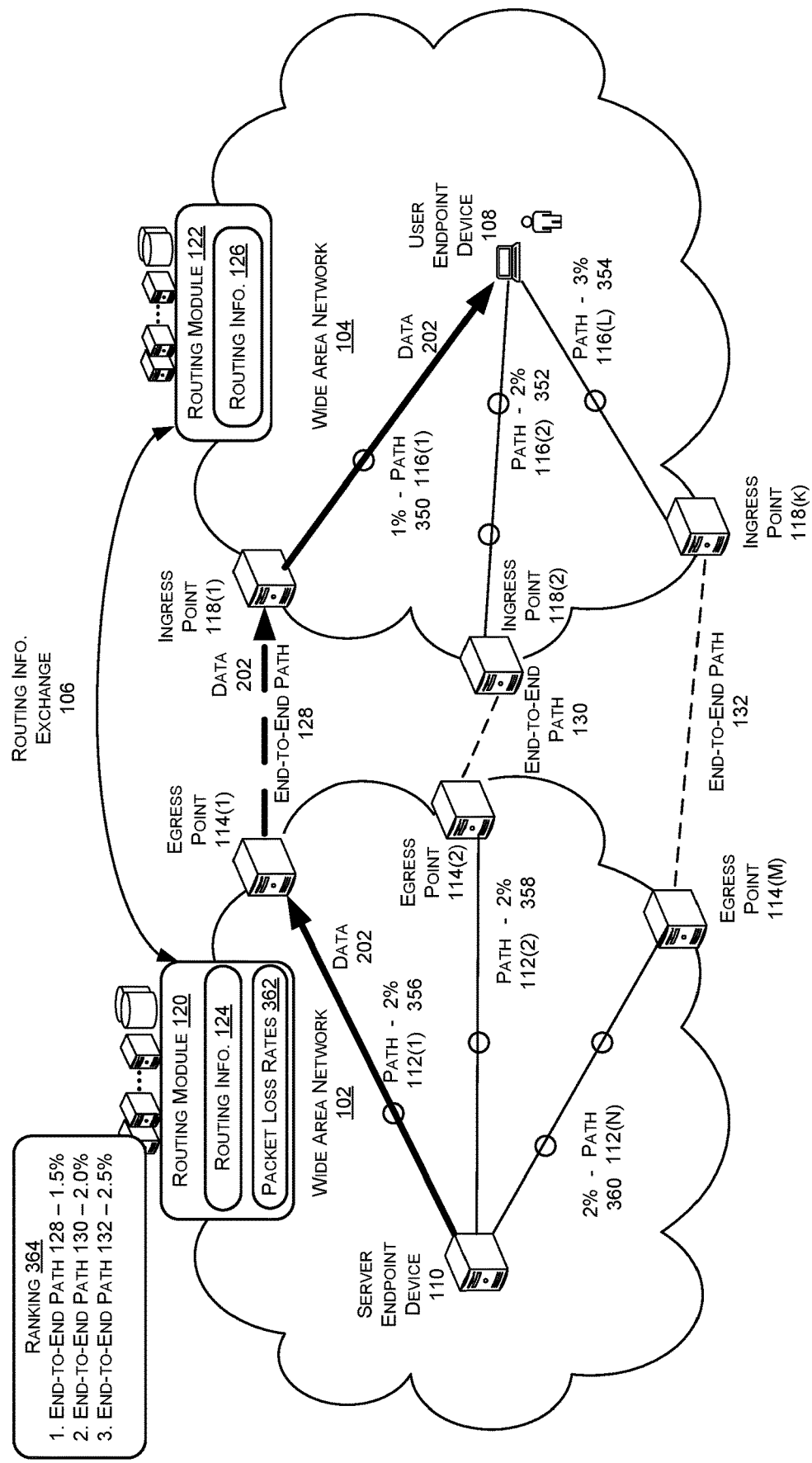
FIG. 3D illustrates an example scenario in which packet loss rate is the performance metric, or one of the performance metrics, used to identify an optimal end-to-end path.

FIG. 3D illustrates an example scenario in which packet loss rate is the performance metric, or one of the performance metrics, used to identify an optimal end-to-end path. The routing information 126 monitored and/or collected by the routing module 122 for WAN 104 can indicate that path 116(1) has a packet loss rate of 1% 350 (e.g., one packet lost per one hundred packets for a defined unit of time), that path 116(2) has a packet loss rate of 2% 352, and that path 116(L) has a packet loss rate of 3% 354. Similarly, the routing information 124 monitored and/or collected by routing module 120 for WAN 102 can indicate that path 112(1) has a packet loss rate of 2% 356, that path 112(2) has a packet loss rate of 2% 358, and that path 112(N) has a packet loss rate of 2% 360.

Consequently, using the routing information 126 received from the routing module 122 via the routing information exchange 106, and the routing information 124 collected internally within its own WAN 102, the routing module 120 can perform calculations that determine an average packet loss rate for paths combined with each other as a result of paired ingress and egress points, thereby generating a set of end-to-end packet loss rates 362 for the end-to-end paths. In one example, the calculation to determine the average packet loss rate can be a weighted calculation based on an estimated time the data is to be transmitted across individual paths within the respective WANs 102, 104.

Furthermore, the routing module 120 can rank the end-to-end paths based on the packet loss rates 362. As shown via the ranking 364, end-to-end path 128 is the top-ranked end-to-end path with an average packet loss rate of 1.5%, end-to-end path 130 is the second-ranked end-to-end path with an average packet loss rate of 2%, and end-to-end path 132 is the third-ranked end-to-end path with an average packet loss rate of 2.5%.

Accordingly, the routing module 120 can identify the top-ranked end-to-end path 128 by comparing the end-to-end average packet loss rates and determining which one has the lowest end-to-end packet loss rate, select the corresponding path 112(1) of the top-ranked end-to-end path 128 that is within its own WAN 102 for a data transmission, and at least initiate the data transmission based on its control and routing decision-making capabilities within WAN 102.

Figure 3E:
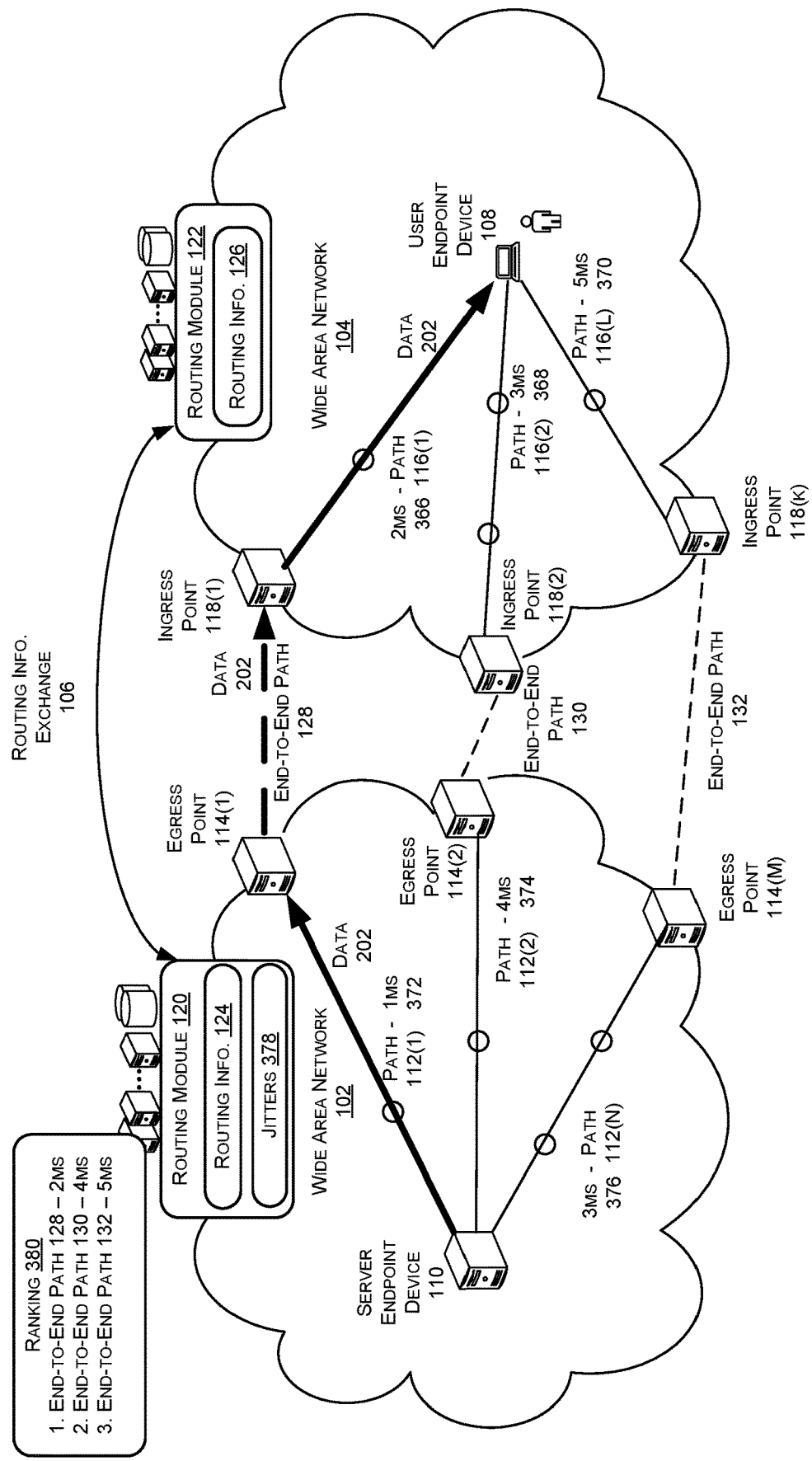
FIG. 3E illustrates an example scenario in which jitter is the performance metric, or one of the performance metrics, used to identify an optimal end-to-end path.

FIG. 3E illustrates an example scenario in which jitter is the performance metric, or one of the performance metrics, used to identify an optimal end-to-end path. The routing information 126 monitored and/or collected by the routing module 122 for WAN 104 can indicate that path 116(1) has a jitter of two milliseconds (ms) 366, that path 116(2) has a jitter of three milliseconds (ms) 368, and that path 116(L) has jitter of five milliseconds (ms) 370. Similarly, the routing information 124 monitored and/or collected by routing module 120 for WAN 102 can indicate that path 112(1) has jitter of one millisecond (ms) 372, that path 112(2) has a jitter of four milliseconds (ms) 374, and that path 112(N) has jitter of three milliseconds (ms) 376.

Consequently, using the routing information 126 received from the routing module 122 via the routing information exchange 106, and the routing information 124 collected internally within its own WAN 102, the routing module 120 can perform operations that compare the maximum jitter for paths combined with each other as a result of paired ingress and egress points, thereby generating a set of end-to-end jitters 378 for the end-to-end paths. The maximum jitter may correspond to a segment of an end-to-end path (e.g., segment 116(1), segment 116(2), segment 112(N), etc.).

Furthermore, the routing module 120 can rank the end-to-end paths based on the jitters 378. As shown via the ranking 380, end-to-end path 128 is the top-ranked end-to-end path with a maximum jitter of 2 ms, end-to-end path 130 is the second-ranked end-to-end path with a maximum jitter of 4 ms, and end-to-end path 132 is the third-ranked end-to-end path with a maximum jitter of 5 ms.

Accordingly, the routing module 120 can identify the top-ranked end-to-end path 128 by comparing the jitter and determining which one has the lowest maximum jitter, select the corresponding path 112(1) of the top-ranked end-to-end path 128 that is within its own WAN 102 for a data transmission, and at least initiate the data transmission based on its control and routing decision-making capabilities within WAN 102.

It is understood in the context of this disclosure that the optimal end-to-end path identification and selection can be based on a single performance factor or metric. However, the routing module 120 can use one of various algorithms with defined weights to identify and select an optimal end-to-end path while considering multiple performance factors or metrics.

Figure 4A:
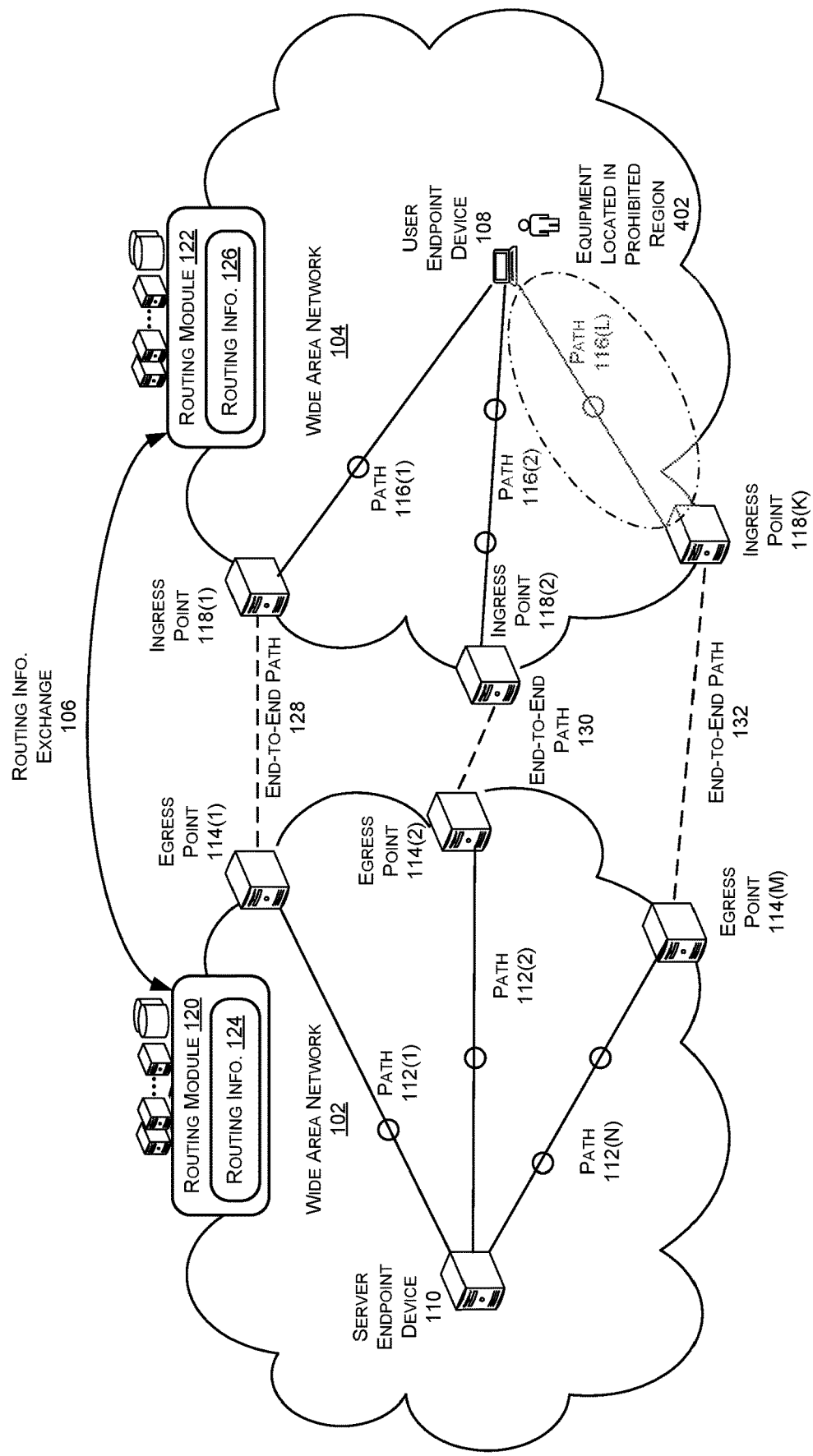
FIG. 4A illustrates an example scenario in which geographic locations of network transmission equipment are used to remove an end-to-end path from consideration for a data transmission in accordance with one or more policies or constraints.

FIG. 4A illustrates an example scenario in which geographic locations of network transmission equipment are used to remove an end-to-end path from consideration for a data transmission in accordance with one or more policies or constraints. The routing information 126 can include geographic locations of network transmission equipment used to transmit data across paths 116(1-L). Accordingly, the routing module 120 can check the geographic locations of the network transmission equipment against policies or constraints that define approved geographic regions (e.g., states, countries, etc.) within which data is allowed to be transmitted and prohibited geographic regions within which data is not allowed to be transmitted.

The policies and constraints can be established by a regulatory agency (e.g., a government), by an owner of the data being transmitted or a service transmitting the data, or by an operator of the WAN 102. Based on the check against the policies or constraints, the routing module 120 can determine that path 116(L) includes at least some network transmission equipment in a prohibited region 402 and remove the end-to-end path 132 from consideration for selection based on the determination.

Figure 4B:
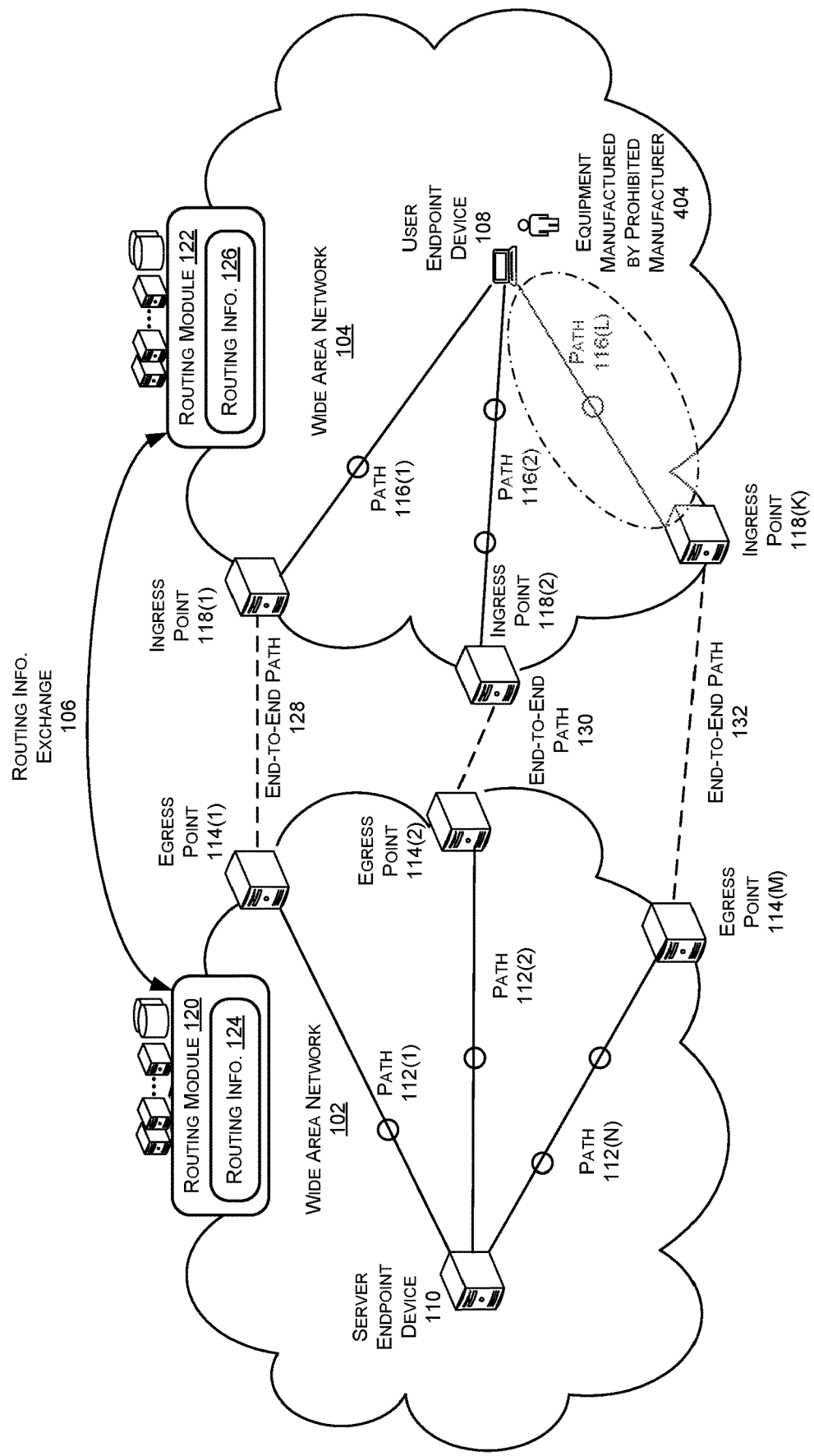
FIG. 4B illustrates an example scenario in which manufacturer identifications of network transmission equipment is used to remove an end-to-end path from consideration for a data transmission in accordance with one or more policies or constraints.

FIG. 4B illustrates an example scenario in which manufacturer identifications of network transmission equipment is used to remove an end-to-end path from consideration for a data transmission in accordance with one or more policies or constraints. The routing information 126 can include manufacturer identifications of network transmission equipment used to transmit data across paths 116(1-L). Accordingly, the routing module 120 can check the manufacturer identifications of the network transmission equipment against policies or constraints that define approved manufacturer identifications allowed handle the data and prohibited manufacturer identifications not allowed to handle the data. Based on the check against the policies or constraints, the routing module 120 can determine that path 116(L) includes at least some network transmission equipment that is manufactured by a prohibited manufacturer 404 and remove the end-to-end path 132 from consideration for selection based on the determination.

In various examples, via the tagging process described with respect to FIG. 2B, the operator of WAN 102 can define geographic regions and/or identifications of manufacturers of network transmission equipment that are approved or prohibited for data transmission purposes, in accordance with a policy or a constraint.

As described above, some WAN operators generally do not want other WAN operators to know specific performance measurements for paths. Accordingly, in various examples, the techniques described herein can include mechanisms that protect the shared routing information such that the optimal end-to-end path can still be identified and selected, yet the specific performance measurements are not known to other WAN operators.

Figure 5:
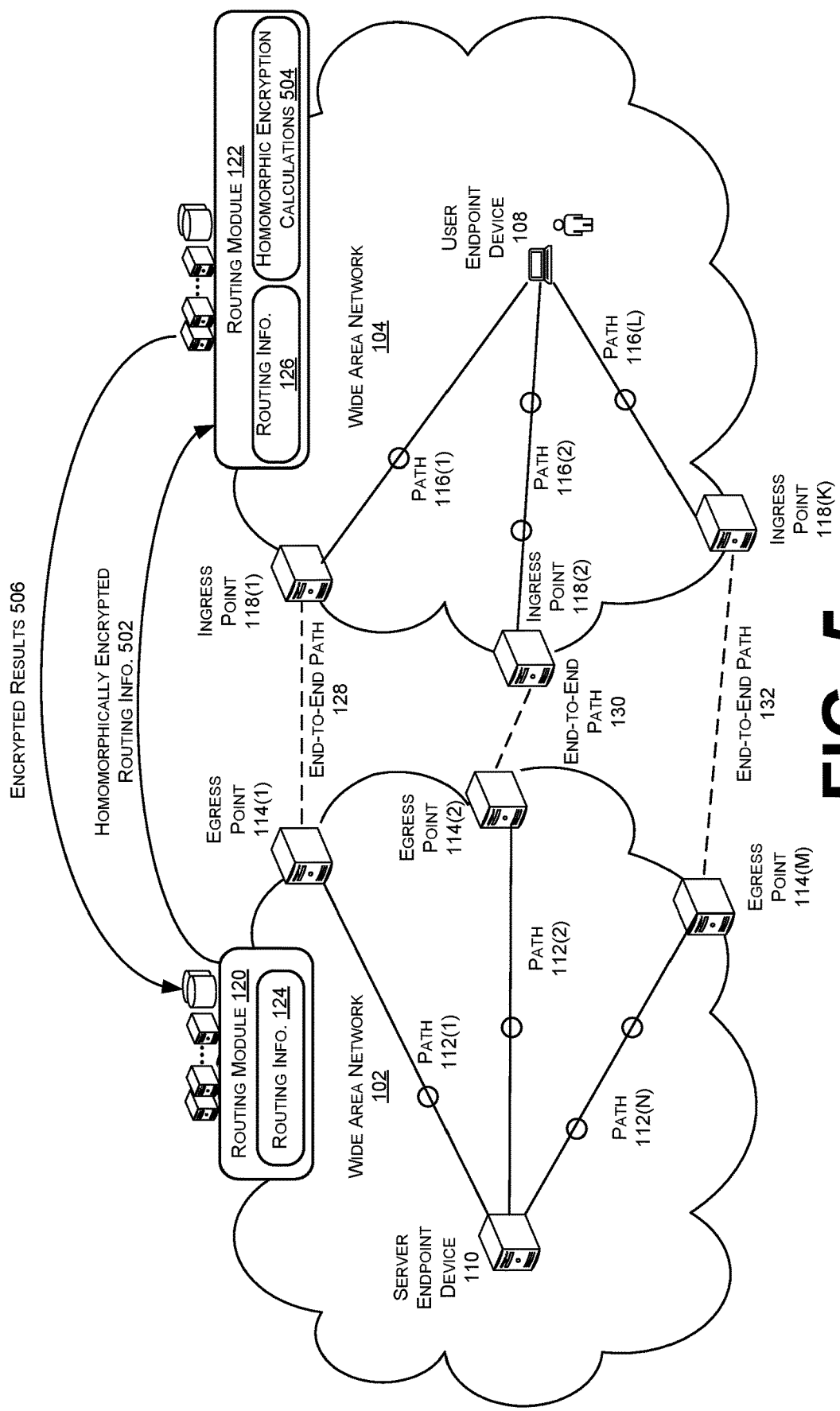
FIG. 5 illustrates the example environment of FIG. 1 in which homomorphic encryption is used to preserve data privacy yet enable the identification of an optimal end-to-end path.

In one example, as shown in FIG. 5, homomorphic encryption is used in association with the routing information exchange. Homomorphic encryption is a form of encryption that permits operators of WANs to perform calculations and operations on encrypted data without first decrypting the encrypted data. The calculations and operations are performed on ciphertexts. The results of the calculations and operations are left in an encrypted form which, when decrypted, provide an identical output to that produced had the calculations and operations been performed on the unencrypted data. Homomorphic encryption can be used to preserve privacy when data is shared for computational purposes.

In FIG. 5, the operator of WAN 102, can share the routing information 124 with the operator of WAN 104 as homomorphically encrypted data 502. Once received, the routing module 122 of WAN 104 can perform homomorphic encryption calculations and operations 504 using the homomorphically encrypted routing information 502 and the routing information 126, examples of which are described above with respect to FIGS. 3A-3E. Then, the routing module 122 of WAN 104 can return the encrypted results 506 to the operator of WAN 102. Similar to the discussion above with respect to FIGS. 3A-3E, the encrypted results 506 can include the identification of an optimal end-to-end path from the server endpoint device 110 to the user endpoint device 108 (e.g., end-to-end path 128).

Consequently, the operator of WAN 104 does not have to share its routing information 126 with the operator of WAN 102. Moreover, the routing information 124 of WAN 102 is protected such that it is not known to the operator of WAN 104. Alternatively, the homomorphic encryption and calculations can be performed by routing module 120 if the operator of WAN 104 is willing to share a homomorphically encrypted version of the routing information 126 with the operator of WAN 102.

Figure 6:
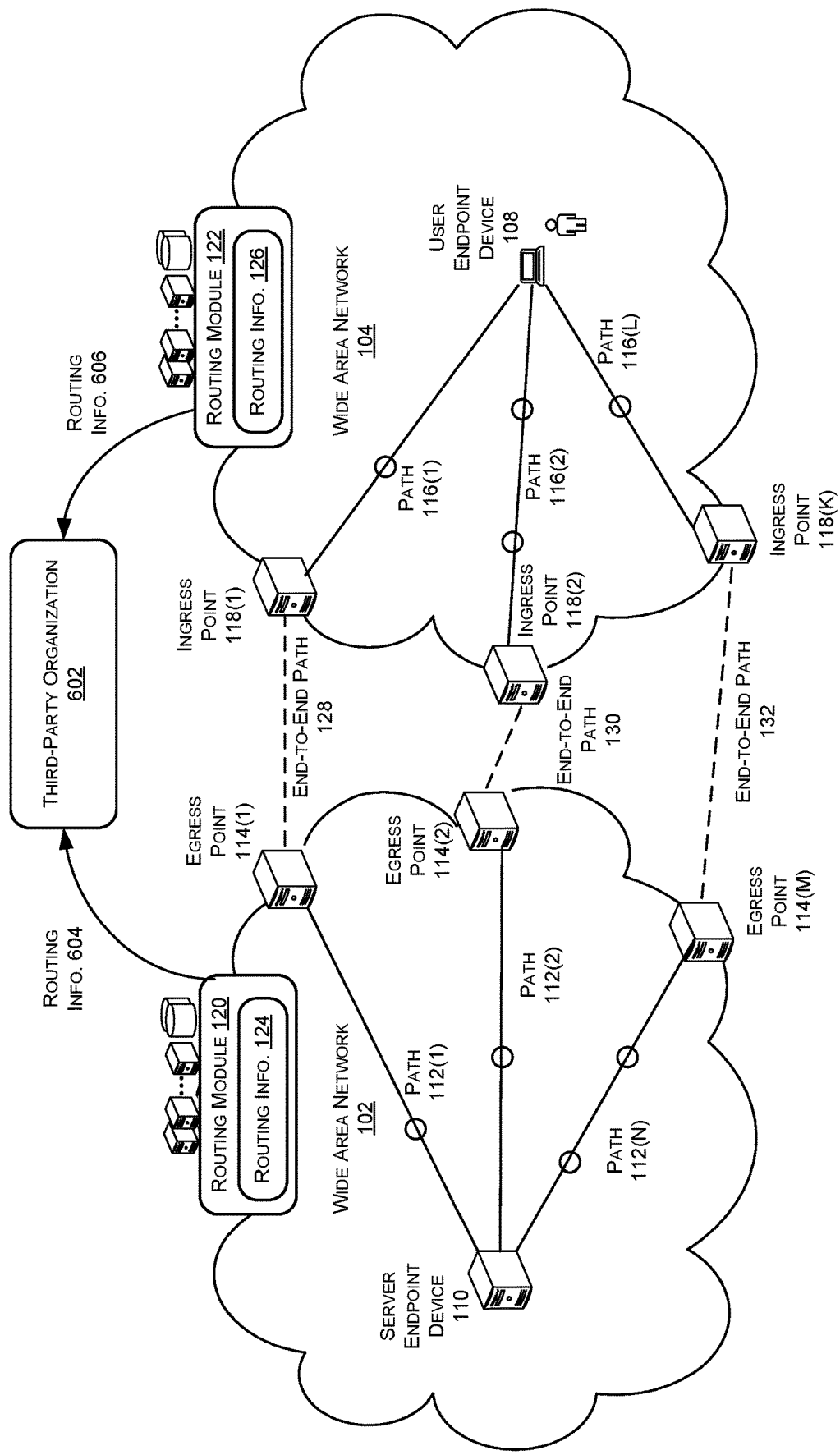
FIG. 6 illustrates the example environment of FIG. 1 in which an intermediate, third-party organization is configured to perform the calculations and operations that identify the optimal end-to-end path.

In another example, as shown in FIG. 6, an intermediate, third-party organization 602 can perform the calculations and operations useable to identify the optimal end-to-end path. As shown, the operators of both WANs 102, 104 can provide the routing information 124, 126 to the third-party organization 602, as represented by 604, 606. Accordingly, the third-party organization 602 can perform the calculations and operations described above with respect to FIGS. 3A-3E, and return the results or the identification of the optimal end-to-end path to one or both of the WANs 604. In this way, the routing information of one WAN does not need to be shared with an operator or another WAN.

While the examples provided above with respect to FIGS. 1-6 describe a bi-lateral routing information exchange between two networks, it is understood in the context of this disclosure that the routing information exchange can also be tri-lateral or quad-lateral exchange where more than two network exchange routing information with each other in order to identify an optimal end-to-end path across more than two networks (e.g., WANs). Three or four disparate networks may be operated by two organizations. Alternatively, three or four disparate networks may be operated by more than two organizations.

Figure 7:
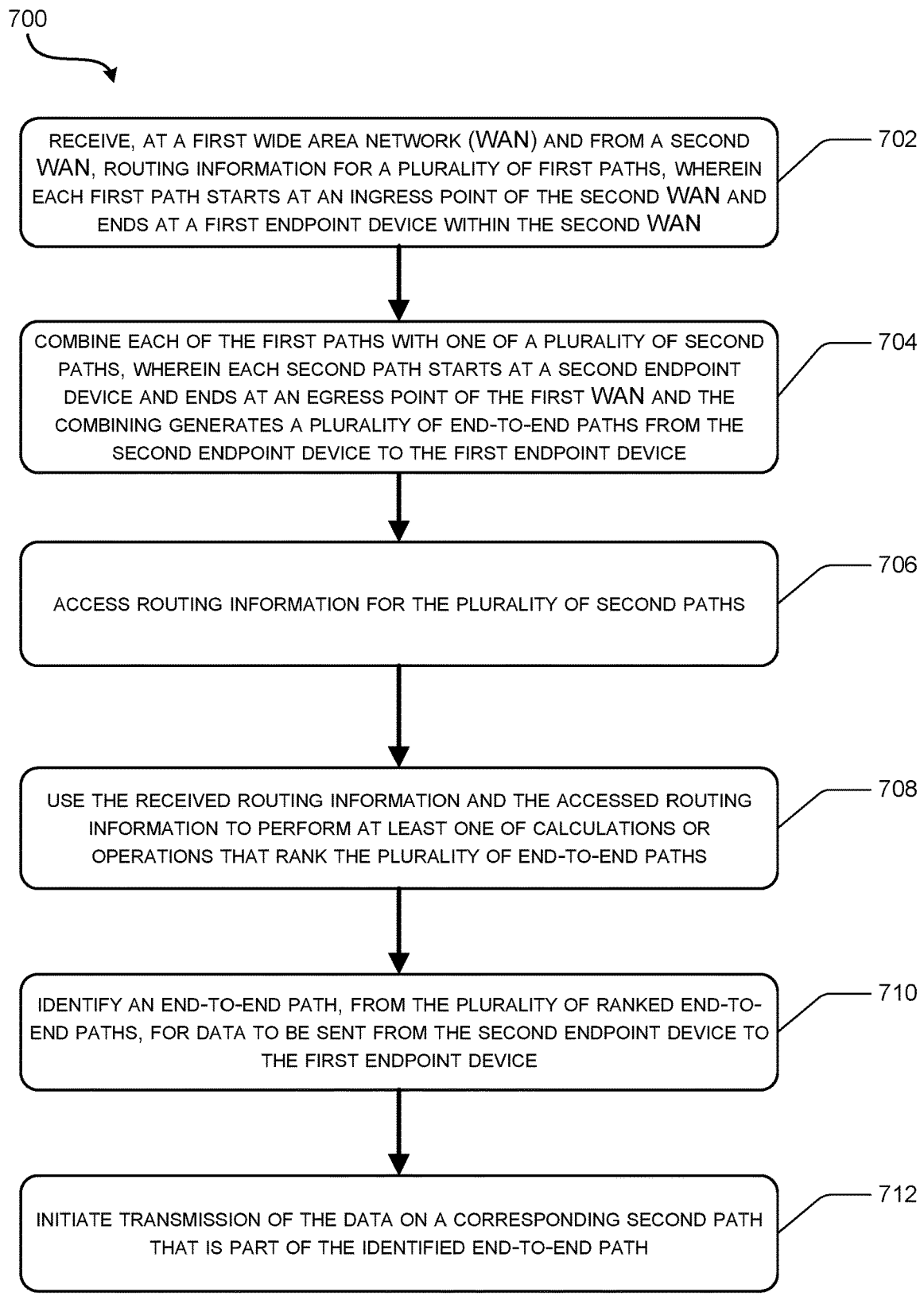
FIG. 7 is a flow diagram illustrating aspects of a sample routine that allows for the identification and selection of an optimal end-to-end path between two endpoint devices that spans multiple networks.

FIG. 7 is a flow diagram illustrating a routine describing aspects of the present disclosure. In various examples, operations of the routine can be performed by one or more devices (e.g., servers) configured to make routing decisions for a data transmission within a network (e.g., a WAN). The logical operations described herein with regards to FIG. 7 can be implemented (1) as a sequence of computer implemented acts or program modules running on a device and/or (2) as interconnected machine logic circuits or circuit modules within a device.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 7, the routine 700 begins at operation 702 where a first device associated with a first wide area network (WAN) receives, from a second device associated with a second WAN, routing information for a plurality of first paths. As described above, each first path starts at an ingress point of the second WAN and ends at a first endpoint device within the second WAN. The routing information can include one or more of latencies, available bandwidths, costs, packet loss rates, jitter, geographic locations of network transmission equipment, and manufacturer identifications of the network transmission equipment.

At operation 704, each of the plurality of first paths are combined with one of a plurality of second paths. As described above, each second path starts at a second endpoint device and ends at an egress point of the first WAN. Consequently, the combination of each of the plurality of first paths with one of the plurality of second paths generates a plurality of end-to-end paths from the second endpoint device to the first endpoint device.

At operation 706, routing information for the plurality of second paths is accessed. In this way, at operation 708, the received routing information and the accessed routing information can be used to perform at least one of calculations or operations that rank the plurality of end-to-end paths.

At operation 710, an end-to-end path can be identified from the plurality of ranked end-to-end paths so that data to be sent from the second endpoint device to the first endpoint device. At operation 712, transmission of the data is initiated on a corresponding second path that is part of the identified end-to-end path.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 8:
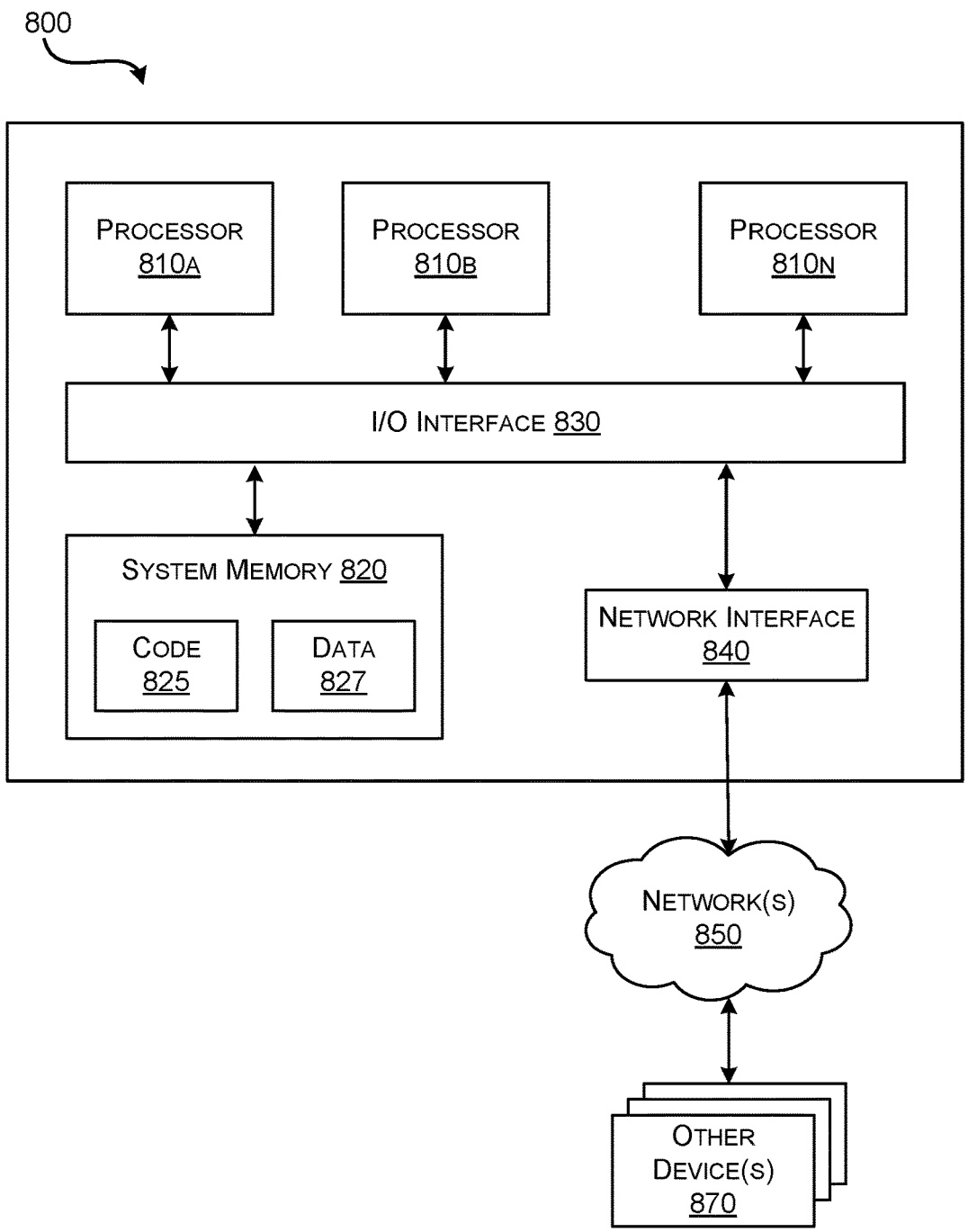
FIG. 8 is an example computing system capable of implementing the techniques of the present disclosure.

FIG. 8 illustrates a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to the I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x77, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 820 as code 825 and data 827.

In one embodiment, the I/O interface 830 may be configured to coordinate I/O traffic between the processor 810, system memory 820, and any peripheral devices in the device, including network interface 840 or other peripheral interfaces. In some embodiments, the I/O interface 830 may perform any necessary protocol, timing, or other data transformations to convert data signals from one component (e.g., system memory 820) into a format suitable for use by another component (e.g., processor 810). In some embodiments, the I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of the I/O interface 830, such as an interface to system memory 820, may be incorporated directly into processor 810.

Network interface 840 may be configured to allow data to be exchanged between computing device 800 and other device or devices 870 attached to a network or network(s) 850, such as other computer systems or components illustrated in FIGS. 1 through 6, for example. In various embodiments, network interface 840 may support communication via any suitable wired or wireless general data networks. Additionally, network interface 840 may support communication via telecommunications/telephony networks such as analog voice networks or digital fiber communications networks, via storage area networks such as Fibre Channel SANs or via any other suitable type of network and/or protocol.

Network(s) 850 may include, for example, public networks such as the Internet, private networks such as an institutional and/or personal intranet, or some combination of private and public networks. Network(s) 850 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 850 may utilize communications protocols, including packet-based and/or datagram-based protocols such as Internet protocol ("IP"), transmission control protocol ("TCP"), user datagram protocol ("UDP"), or other types of protocols. Moreover, network(s) 850 may also include a number of devices that facilitate network communications and/or form a hardware basis for the networks, such as switches, routers, gateways, access points, firewalls, base stations, repeaters, backbone devices, and the like.

In some embodiments, system memory 820 may be one embodiment of a computer-accessible medium configured to store program instructions and data as described above for FIGS. 1-7. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840.

Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Example Clause A, a method comprising: receiving, at a first device associated with a first wide area network (WAN) and from a second device associated with a second WAN, routing information for a plurality of first paths, wherein each first path starts at one of a plurality of ingress points of the second WAN and ends at a first endpoint device within the second WAN; combining, by one or more processors of the first device, each of the plurality of first paths with one of a plurality of second paths, wherein each second path starts at a second endpoint device and ends at one of a plurality of egress points of the first WAN and the combining of each of the plurality of first paths with one of the plurality of second paths generates a plurality of end-to-end paths from the second endpoint device to the first endpoint device; accessing routing information for the plurality of second paths; using the received routing information and the accessed routing information to perform at least one of calculations or operations that rank the plurality of end-to-end paths; identifying an end-to-end path, from the plurality of ranked end-to-end paths, for data to be sent from the second endpoint device to the first endpoint device; and initiating transmission of the data on a corresponding second path that is part of the identified end-to-end path.

Example Clause B, the method of Example Clause A, further comprising tagging individual packets of the data to effectively cause an operator of the second WAN to select a corresponding first path, that is also part of the identified end-to-end path, to transmit the data.

Example Clause C, the method of Example Clause A or Example Clause B, wherein the combinations are made based on geographic proximity between an ingress point and an egress point.

Example Clause D, the method of Example Clause C, wherein: the received routing information and the accessed routing information comprise latencies for the plurality of first paths and the plurality of second paths; the at least one of the calculations or the operations include additions of the latencies for an individual first path associated with the ingress point and an individual second path associated with the egress point, such that a top-ranked end-to-end path of the plurality of ranked end-to-end paths has a lowest end-to-end latency; and the identified end-to-end path comprises the top-ranked end-to-end path.

Example Clause E, the method of Example Clause C, wherein: the received routing information and the accessed routing information comprise available bandwidth for the plurality of first paths and the plurality of second paths; the at least one of the calculations or the operations include comparing minimum available bandwidths for the plurality of end-to-end paths, such that a top-ranked end-to-end path of the plurality of ranked end-to-end paths has a highest minimum available bandwidth; and the identified end-to-end path comprises the top-ranked end-to-end path.

Example Clause F, the method of Example Clause C, wherein: the received routing information and the accessed routing information comprise costs for the plurality of first paths and the plurality of second paths; the at least one of the calculations or the operations include additions of the costs for an individual first path associated with the ingress point and an individual second path associated with the egress point, such that a top-ranked end-to-end path of the plurality of ranked end-to-end paths has a lowest end-to-end cost; and the identified end-to-end path comprises the top-ranked end-to-end path.

Example Clause G, the method of Example Clause C, wherein: the received routing information and the accessed routing information comprise packet loss rates for the plurality of first paths and the plurality of second paths; the at least one of the calculations or the operations include averaging the packet loss rates for an individual first path associated with the ingress point and an individual second path associated with the egress point, such that a top-ranked end-to-end path of the plurality of ranked end-to-end paths has a lowest average packet loss rate; and the identified end-to-end path comprises the top-most ranked end-to-end path.

Example Clause H, the method of Example Clause C, wherein: the received routing information and the accessed routing information comprise jitter for the plurality of first paths and the plurality of second paths; the at least one of the calculations or the operations include comparing maximum jitters for the plurality of end-to-end paths, such that a top-ranked end-to-end path of the plurality of ranked end-to-end paths has a lowest maximum jitter; and the identified end-to-end path comprises the top-most ranked end-to-end path.

Example Clause I, the method of any one of Example Clauses A through H, wherein the received routing information comprises geographic locations of network transmission equipment used in the plurality of first paths, the method further comprising removing at least one end-to-end path from consideration based at least in part on a determination that at least some of the network transmission equipment used on the at least one end-to-end path is geographically located in prohibited regions defined by one or more policies or constraints.

Example Clause J, the method of any one of Example Clauses A through H, wherein the received routing information comprises manufacturer identifications of network transmission equipment used in the plurality of first paths, the method further comprising removing at least one end-to-end path from consideration based at least in part on a determination that at least some of the network transmission equipment used on the at least one end-to-end path is manufactured by a prohibited manufacturer identification defined by one or more policies or constraints.

Example Clause K, the method of any one of Example Clauses A through J, wherein the routing information is received based on a prior established agreement between a first organization that operates the first WAN and a second organization the operates the second WAN.

Example Clause L, a system, comprising: one or more processors; and a computer-readable storage medium having computer-executable instructions stored thereupon which, when executed by the one or more processors, cause the system to perform operations comprising: receiving, from a first wide area network (WAN), routing information for a plurality of first paths, wherein each first path starts at one of a plurality of ingress points of the first WAN and ends at a first endpoint device within the first WAN; combining each of the plurality of first paths with one of a plurality of second paths, wherein each second path starts at a second endpoint device and ends at one of a plurality of egress points of a second WAN and the combining of each of the plurality of first paths with one of the plurality of second paths generates a plurality of end-to-end paths from the second endpoint device to the first endpoint device; accessing routing information for the plurality of second paths; using the received routing information and the accessed routing information to perform at least one of calculations or operations that rank the plurality of end-to-end paths; and identifying an end-to-end path, from the plurality of ranked end-to-end paths, for data to be sent from the second endpoint device to the first endpoint device.

Example Clause M, the system of Example Clause L, wherein the combinations are made based on geographic proximity between an ingress point and an egress point.

Example Clause N, the system of Example Clause M, wherein: the received routing information and the accessed routing information comprise latencies for the plurality of first paths and the plurality of second paths; the at least one of the calculations or the operations include additions of the latencies for an individual first path associated with the ingress point and an individual second path associated with the egress point, such that a top-ranked end-to-end path of the plurality of ranked end-to-end paths has a lowest end-to-end latency; and the identified end-to-end path comprises the top-ranked end-to-end path.

Example Clause O, the system of Example Clause M, wherein: the received routing information and the accessed routing information comprise available bandwidth for the plurality of first paths and the plurality of second paths; the at least one of the calculations or the operations include comparing minimum available bandwidths for the plurality of end-to-end paths, such that a top-ranked end-to-end path of the plurality of ranked end-to-end paths has a highest minimum available bandwidth; and the identified end-to-end path comprises the top-ranked end-to-end path.

Example Clause P, the system of Example Clause M, wherein: the received routing information and the accessed routing information comprise packet loss rates for the plurality of first paths and the plurality of second paths; the at least one of the calculations or the operations include averaging the packet loss rates for an individual first path associated with the ingress point and an individual second path associated with the egress point, such that a top-ranked end-to-end path of the plurality of ranked end-to-end paths has a lowest average packet loss rate; and the identified end-to-end path comprises the top-most ranked end-to-end path.

Example Clause Q, the system of Example Clause M, wherein: the received routing information and the accessed routing information comprise jitter for the plurality of first paths and the plurality of second paths; the at least one of the calculations or the operations include comparing maximum jitters for the plurality of end-to-end paths, such that a top-ranked end-to-end path of the plurality of ranked end-to-end paths has a lowest maximum jitter; and the identified end-to-end path comprises the top-most ranked end-to-end path.

Example Clause R, the system of any one of Example Clauses L through Q, wherein the operations are performed by a third-party on behalf of an operator of the first WAN and an operator of the second WAN.

Example Clause S, the system of any one of Example Clauses L through Q, wherein the received routing information is homomorphically encrypted.

Example Clause T, one or more computer-readable storage media having computer-executable instructions stored thereupon which, when executed by one or more processors, cause a system associated with a first wide area network (WAN) to perform operations comprising: receiving, from a second WAN, routing information for a plurality of first paths, wherein each first path starts at one of a plurality of ingress points of the second WAN and ends at a first endpoint device within the second WAN; combining each of the plurality of first paths with one of a plurality of second paths, wherein each second path starts at a second endpoint device and ends at one of a plurality of egress points of the first WAN and the combining of each of the plurality of first paths with one of the plurality of second paths generates a plurality of end-to-end paths from the second endpoint device to the first endpoint device; accessing routing information for the plurality of second paths; using the received routing information and the accessed routing information to perform at least one of calculations or operations that rank the plurality of end-to-end paths; identifying an end-to-end path, from the plurality of ranked end-to-end paths, for data to be sent from the second endpoint device to the first endpoint device; and initiating transmission of the data on a corresponding second path that is part of the identified end-to-end path.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different WANs, two different endpoint devices, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
  receiving, at a first device associated with a first wide area network (WAN) operated by a first operator and from a second device associated with a second WAN operated by a second operator, routing information for a plurality of first paths, wherein each first path of the plurality of first paths starts at an ingress point of a plurality of ingress points of the second WAN and ends at a first endpoint device within the second WAN;
  combining, by one or more processors of the first device, each first path of the plurality of first paths with a second path of a plurality of second paths, wherein:
    each second path starts at a second endpoint device and ends at an egress point of a plurality of egress points of the first WAN, the egress point at which the second path ends being a match for the ingress point at which the first path, that is combined with the second path, starts; and
    the combining of each first path of the plurality of first paths with the second path of the plurality of second paths generates a plurality of end-to-end paths from the second endpoint device to the first endpoint device;
  accessing routing information for the plurality of second paths;
  using the received routing information and the accessed routing information to perform at least one of calculations or operations that rank the plurality of end-to-end paths;

identifying an end-to-end path, from the plurality of ranked end-to-end paths, for data to be sent from the second endpoint device to the first endpoint device; and initiating transmission of the data on a corresponding second path that is part of the identified end-to-end path.

2. The method of claim 1, further comprising tagging individual packets of the data to effectively cause the second operator of the second WAN to select a corresponding first path, that is also part of the identified end-to-end path, to transmit the data.

3. The method of claim 1, wherein the match is based on geographic proximity between the ingress point and the egress point.

4. The method of claim 3, wherein:
the received routing information and the accessed routing information comprise latencies for the plurality of first paths and the plurality of second paths;
the at least one of the calculations or the operations include additions of the latencies for an individual first path associated with the ingress point and an individual second path associated with the egress point, such that a top-ranked end-to-end path of the plurality of ranked end-to-end paths has a lowest end-to-end latency; and
the identified end-to-end path comprises the top-ranked end-to-end path.

5. The method of claim 3, wherein:
the received routing information and the accessed routing information comprise available bandwidth for the plurality of first paths and the plurality of second paths;
the at least one of the calculations or the operations include comparing minimum available bandwidths for the plurality of end-to-end paths, such that a top-ranked end-to-end path of the plurality of ranked end-to-end paths has a highest minimum available bandwidth; and
the identified end-to-end path comprises the top-ranked end-to-end path.

6. The method of claim 3, wherein:
the received routing information and the accessed routing information comprise costs for the plurality of first paths and the plurality of second paths;
the at least one of the calculations or the operations include additions of the costs for an individual first path associated with the ingress point and an individual second path associated with the egress point, such that a top-ranked end-to-end path of the plurality of ranked end-to-end paths has a lowest end-to-end cost; and
the identified end-to-end path comprises the top-ranked end-to-end path.

7. The method of claim 3, wherein:
the received routing information and the accessed routing information comprise packet loss rates for the plurality of first paths and the plurality of second paths;
the at least one of the calculations or the operations include averaging the packet loss rates for an individual first path associated with the ingress point and an individual second path associated with the egress point, such that a top-ranked end-to-end path of the plurality of ranked end-to-end paths has a lowest average packet loss rate; and
the identified end-to-end path comprises the top-most ranked end-to-end path.

8. The method of claim 3, wherein:
the received routing information and the accessed routing information comprise jitter for the plurality of first paths and the plurality of second paths;
the at least one of the calculations or the operations include comparing maximum jitters for the plurality of end-to-end paths, such that a top-ranked end-to-end path of the plurality of ranked end-to-end paths has a lowest maximum jitter; and
the identified end-to-end path comprises the top-most ranked end-to-end path.

9. The method of claim 1, wherein the received routing information comprises geographic locations of network transmission equipment used in the plurality of first paths, the method further comprising removing at least one end-to-end path from consideration based at least in part on a determination that at least some of the network transmission equipment used on the at least one end-to-end path is geographically located in prohibited regions defined by one or more policies or constraints.

10. The method of claim 1, wherein the received routing information comprises manufacturer identifications of network transmission equipment used in the plurality of first paths, the method further comprising removing at least one end-to-end path from consideration based at least in part on a determination that at least some of the network transmission equipment used on the at least one end-to-end path is manufactured by a prohibited manufacturer identification defined by one or more policies or constraints.

11. The method of claim 1, wherein the routing information is received based on a prior established agreement between the first operator of the first WAN and the second operator of the second WAN.

12. A system, comprising:
one or more processors; and
a computer-readable storage medium having computer-executable instructions stored thereupon which, when executed by the one or more processors, cause the system to perform operations comprising:
receiving, from a first wide area network (WAN) operated by a first operator, routing information for a plurality of first paths, wherein each first path of the plurality of first paths starts at an ingress point of a plurality of ingress points of the first WAN and ends at a first endpoint device within the first WAN;
combining each first path of the plurality of first paths with a second path of a plurality of second paths, wherein:
each second path starts at a second endpoint device and ends at an egress point of a plurality of egress points of a second WAN operated by a second operator, the egress point at which the second path ends being a match for the ingress point at which the first path, that is combined with the second path, starts; and
the combining of each first path of the plurality of first paths with the second path of the plurality of second paths generates a plurality of end-to-end paths from the second endpoint device to the first endpoint device;
accessing routing information for the plurality of second paths;
using the received routing information and the accessed routing information to perform at least one of calculations or operations that rank the plurality of end-to-end paths; and
identifying an end-to-end path, from the plurality of ranked end-to-end paths, for data to be sent from the second endpoint device to the first endpoint device.

13. The system of claim 12, wherein the match is based on geographic proximity between the ingress point and the egress point.

14. The system of claim 13, wherein:
the received routing information and the accessed routing information comprise latencies for the plurality of first paths and the plurality of second paths;
the at least one of the calculations or the operations include additions of the latencies for an individual first path associated with the ingress point and an individual second path associated with the egress point, such that a top-ranked end-to-end path of the plurality of ranked end-to-end paths has a lowest end-to-end latency; and
the identified end-to-end path comprises the top-ranked end-to-end path.

15. The system of claim 13, wherein:
the received routing information and the accessed routing information comprise available bandwidth for the plurality of first paths and the plurality of second paths;
the at least one of the calculations or the operations include comparing minimum available bandwidths for the plurality of end-to-end paths, such that a top-ranked end-to-end path of the plurality of ranked end-to-end paths has a highest minimum available bandwidth; and
the identified end-to-end path comprises the top-ranked end-to-end path.

16. The system of claim 13, wherein:
the received routing information and the accessed routing information comprise packet loss rates for the plurality of first paths and the plurality of second paths;
the at least one of the calculations or the operations include averaging the packet loss rates for an individual first path associated with the ingress point and an individual second path associated with the egress point, such that a top-ranked end-to-end path of the plurality of ranked end-to-end paths has a lowest average packet loss rate; and
the identified end-to-end path comprises the top-most ranked end-to-end path.

17. The system of claim 13, wherein:
the received routing information and the accessed routing information comprise jitter for the plurality of first paths and the plurality of second paths;
the at least one of the calculations or the operations include comparing maximum jitters for the plurality of end-to-end paths, such that a top-ranked end-to-end path of the plurality of ranked end-to-end paths has a lowest maximum jitter; and
the identified end-to-end path comprises the top-most ranked end-to-end path.

18. The system of claim 12, wherein the operations are performed by a third-party on behalf of the first operator of the first WAN and the second operator of the second WAN.

19. The system of claim 12, wherein the received routing information is homomorphically encrypted.

20. One or more computer-readable storage media having computer-executable instructions stored thereupon which, when executed by one or more processors, cause a system associated with a first wide area network (WAN) operated by a first operator to perform operations comprising:
receiving, from a second WAN operated by a second operator, routing information for a plurality of first paths, wherein each first path of the plurality of first paths starts at an ingress point of a plurality of ingress points of the second WAN and ends at a first endpoint device within the second WAN;
combining each first path of the plurality of first paths with a second path of a plurality of second paths, wherein:
each second path starts at a second endpoint device and ends at an egress point of a plurality of egress points of the first WAN, the egress point at which the second path ends being a match for the ingress point at which the first path, that is combined with the second path, starts; and
the combining of each first path of the plurality of first paths with the second path of the plurality of second paths generates a plurality of end-to-end paths from the second endpoint device to the first endpoint device;
accessing routing information for the plurality of second paths;
using the received routing information and the accessed routing information to perform at least one of calculations or operations that rank the plurality of end-to-end paths;
identifying an end-to-end path, from the plurality of ranked end-to-end paths, for data to be sent from the second endpoint device to the first endpoint device; and
initiating transmission of the data on a corresponding second path that is part of the identified end-to-end path.

* * * * *